(12) United States Patent
Norkin

(10) Patent No.: US 10,397,615 B2
(45) Date of Patent: Aug. 27, 2019

(54) STRONG DEBLOCKING FILTERING DECISIONS

(71) Applicant: TELEFONAKTIEBOLAGET L M ERICSSON (PUBL), Stockholm (SE)

(72) Inventor: Andrey Norkin, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 318 days.

(21) Appl. No.: 14/412,964

(22) PCT Filed: Jun. 30, 2013

(86) PCT No.: PCT/SE2013/050833
§ 371 (c)(1),
(2) Date: Jan. 5, 2015

(87) PCT Pub. No.: WO2014/007736
PCT Pub. Date: Jan. 9, 2014

(65) Prior Publication Data
US 2015/0208096 A1 Jul. 23, 2015

Related U.S. Application Data

(60) Provisional application No. 61/667,505, filed on Jul. 3, 2012.

(51) Int. Cl.
*H04N 19/80* (2014.01)
*H04N 19/176* (2014.01)
(Continued)

(52) U.S. Cl.
CPC .......... *H04N 19/80* (2014.11); *H04N 19/117* (2014.11); *H04N 19/14* (2014.11); *H04N 19/167* (2014.11);
(Continued)

(58) Field of Classification Search
CPC .... H04N 19/80; H04N 19/117; H04N 19/182; H04N 19/176; H04N 19/167
See application file for complete search history.

(56) References Cited

U.S. PATENT DOCUMENTS

| | | | |
|---|---|---|---|
| 2004/0101059 A1* | 5/2004 | Joch | H04N 19/159 375/240.29 |
| 2011/0194614 A1* | 8/2011 | Norkin | H04N 19/176 375/240.24 |

(Continued)

FOREIGN PATENT DOCUMENTS

WO  2002096117 A1  11/2002

OTHER PUBLICATIONS

Bross et al: "High efficiency video coding (HEVC) text specification draft 7", Output Document of JCT-VC, Joint Collaborative Team on Video Coding (JCT-VC) of ITU-T SG16 WP3 and ISO/IEC JTC1/SC29/WG11, 9th Meeting 2012, 268 pages.

(Continued)

*Primary Examiner* — Shawn S An
(74) *Attorney, Agent, or Firm* — Rothwell, Figg, Ernst & Manbeck, P.C.

(57) ABSTRACT

A deblocking filtering control comprises checking whether pixel values of four pixels (12, 22) in a line (15) of pixels (12, 22) in a block (10) of pixels (12) and in a neighboring block (20) of pixels (22) form an approximate line. If the pixel values of the four pixels (12, 22) in the line (15) of pixels (12, 20) in both the block (10) of pixels (12) and in the neighboring block (20) of pixels (22) form an approximate line the deblocking filtering control selects to apply strong deblocking filtering to pixel values in the line (15) of pixels (12, 22). The subject and objective quality of the deblocking filtering is thereby improved by applying strong (Continued)

deblocking filter to areas where the signal in a picture (1) not only has the form of a flat line but also form a ramp.

10 Claims, 9 Drawing Sheets

(51) Int. Cl.
    *H04N 19/117* (2014.01)
    *H04N 19/14* (2014.01)
    *H04N 19/86* (2014.01)
    *H04N 19/167* (2014.01)
    *H04N 19/182* (2014.01)
    *H04N 19/61* (2014.01)

(52) U.S. Cl.
    CPC ......... *H04N 19/176* (2014.11); *H04N 19/182* (2014.11); *H04N 19/86* (2014.11); *H04N 19/61* (2014.11)

(56) References Cited

U.S. PATENT DOCUMENTS

| | | | |
|---|---|---|---|
| 2013/0003865 A1* | 1/2013 | Norkin | H04N 19/176 375/240.25 |
| 2013/0034169 A1* | 2/2013 | Sadafale | H04N 19/176 375/240.24 |
| 2013/0170562 A1* | 7/2013 | Van der Auwera | H04N 19/0089 375/240.25 |

OTHER PUBLICATIONS

Andrey Norkin et al: "CE12.1: Ericsson deblocking filter", 96. MPEG Meeting; Mar. 21, 2011-Mar. 25, 2011; Geneva; (Motion Picture Expert Group or ISO/IEC JTC1/SC29/WG11), No. m19803, Mar. 19, 2011 (Mar. 19, 2011), XP030048370, 17 pages.

* cited by examiner

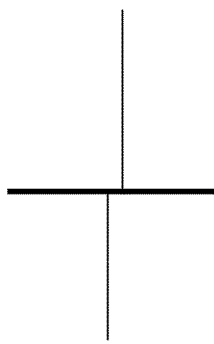
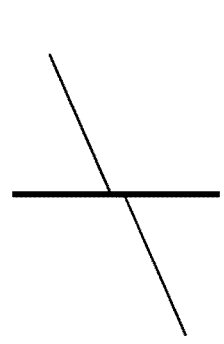
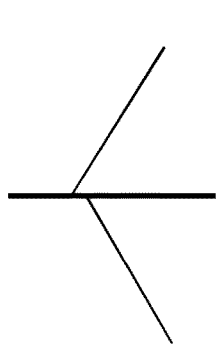
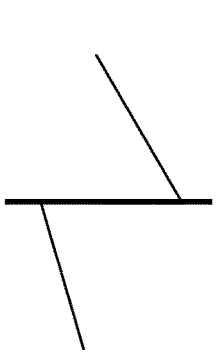
FIG. 16A
FIG. 16B
FIG. 16C
FIG. 16D
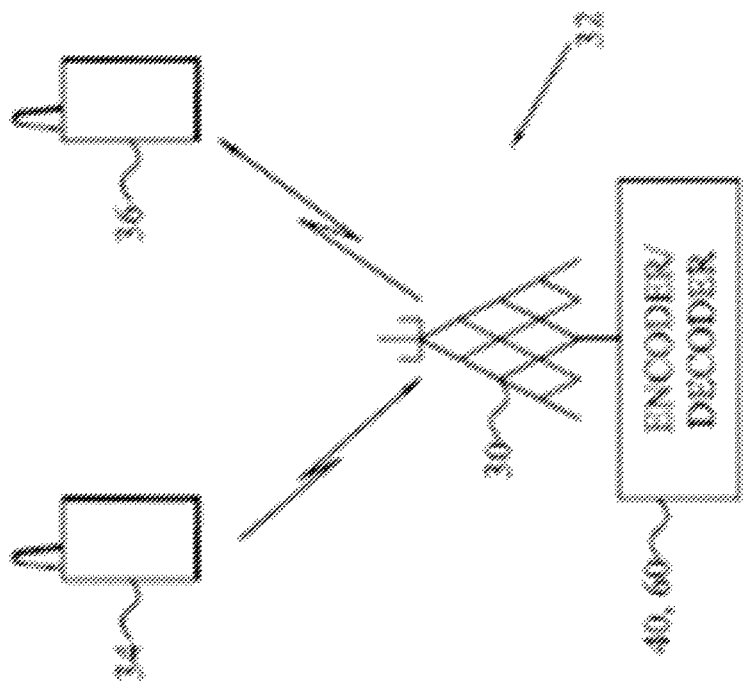
FIG. 6

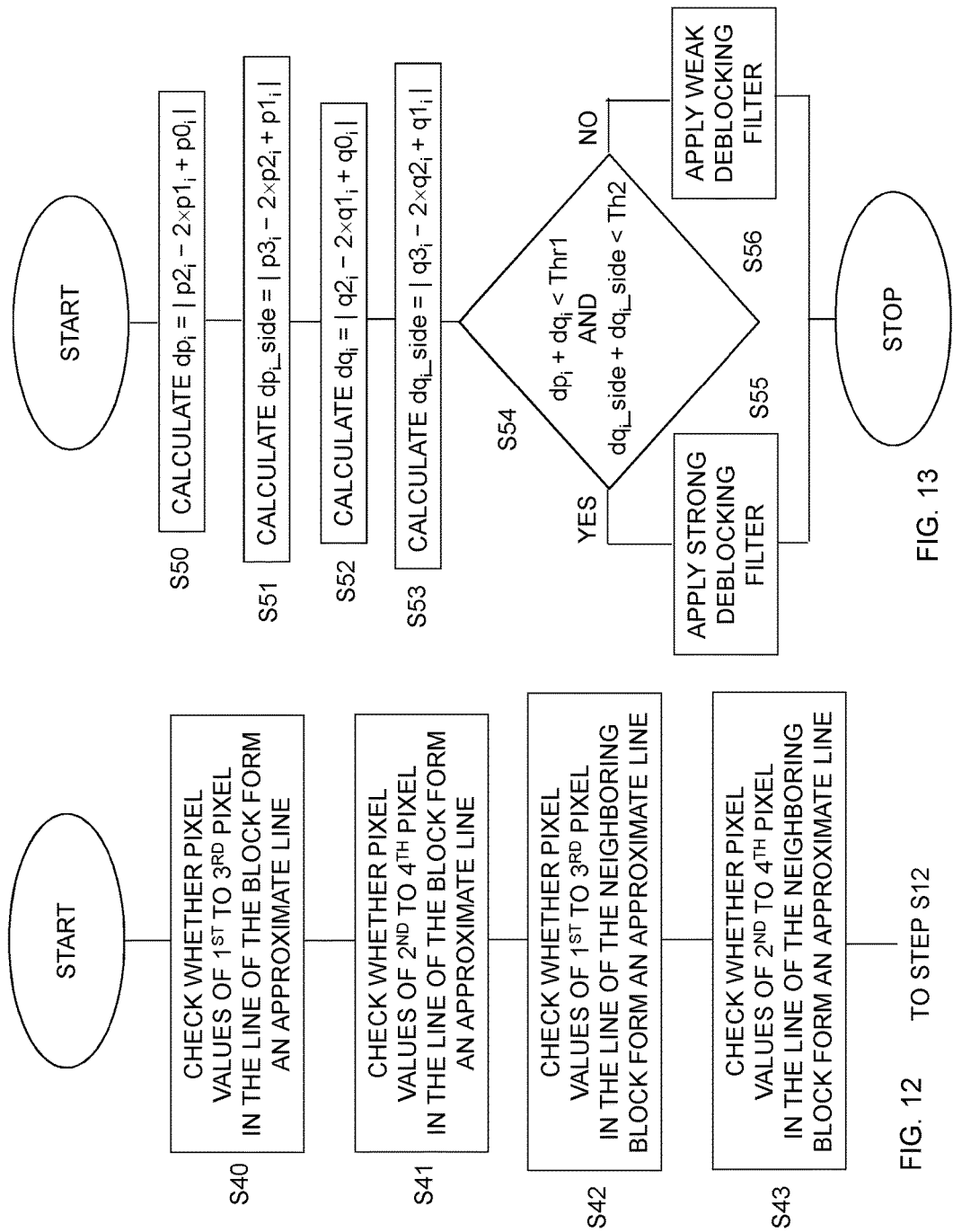

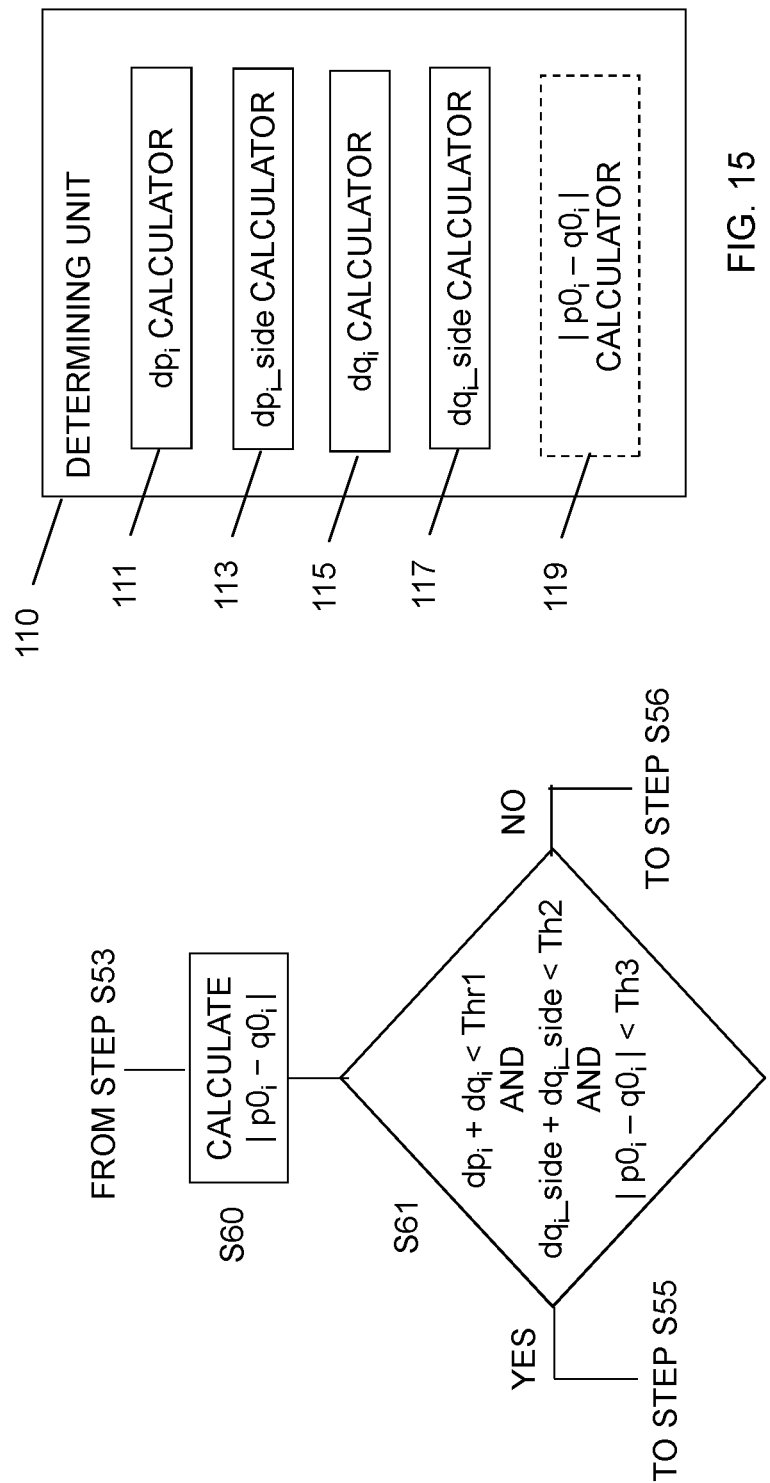

STRONG DEBLOCKING FILTERING DECISIONS

CROSS REFERENCE TO RELATED APPLICATION(S)

This application is a 35 U.S.C. § 371 National Phase Entry Application from PCT/SE2013/050833, filed Jun. 30, 2013, designating the United States, and also claims the benefit of U.S. Provisional Application No. 61/667,505, filed Jul. 3, 2012. The disclosures of both applications are incorporated herein in their entirety by reference.

TECHNICAL FIELD

The present embodiments generally relate to deblocking filtering and in particular to controlling deblocking filtering over a block boundary between neighboring blocks of pixels in a picture.

BACKGROUND

Deblocking filters are used in video coding standards in order to combat blocking artifacts. The blocking artifacts arise because the original video is split into blocks which are processed relatively independently. The blocking artifacts can arise due to different intra prediction of blocks, quantization effects and motion compensation. Two particular variants of deblocking are described below.

These descriptions assume a vertical block boundary or border. The process is also done in the same way for horizontal block boundaries.

H.264 Deblocking

In state of the art video coding such as H.264 there is an adaptive de-blocking filter/loop filter after prediction and residual reconstruction, but before storage of the reconstruction for later reference when encoding or decoding subsequent frames. The deblocking filtering consists of several steps such as filter decisions, filtering operations, a clipping function and changes of pixel values. The decision to filter the border or not is made based on evaluating several conditions. Filter decisions depend on macro block (MB) type, motion vector (MV) difference between neighboring blocks, whether neighboring blocks have coded residuals and on the local structure of the current and/or neighboring blocks.

The amount of filtering for a pixel depends on the position of that pixel relative to the block boundary and on the quantization parameter (QP) value used for residual coding. Here below a to h represent pixel values across a vertical block boundary.

abcd|efgh

The filter decision is based on comparing three pixel differences with three thresholds. The thresholds are adapted to the QP.

If the following conditions are fulfilled the filtering is done:

$abs(d-e) < thr1$, $abs(c-d) < thr2$, and $abs(e-f) < thr2$ where thr1 and thr2 are functions of QP.

There are two filtering modes in H.264. In the first filtering mode (normal filtering), filtering can be described with a delta value that the filtering changes the current pixel value with. The filtering for the pixel closest to the block boundary is:

$d' = d + \text{delta}$ and $e' = e - \text{delta}$ where delta has been clipped off to a threshold $\pm thr3$ to a value that is constrained by the QP. d' is here the pixel value at position d after filtering and e' is the pixel value after filtering at position e. More filtering is allowed for high QP than for low QP.

Clipping can be described as:

$\text{delta\_clipped} = \max(-thr3, \min(thr3, \text{delta}))$ where thr3 is controlling the filter strength. A larger value of thr3 means that the filtering is stronger, which in turns means that a stronger low-pass filtering effect will happen.

The filter strength can be increased if any of the following two conditions also holds:

$abs(b-d) < thr2$ and $abs(e-g) < thr2$

The filter strength is adapted by clipping the delta less, e.g. to allow for more variation.

The second filtering mode (strong filtering) is applied for intra macroblock boundaries only, when the following condition is fulfilled:

$abs(d-e) < thr\frac{1}{4}$.

The thresholds thr1, thr2 and thr3 are derived from table lookup using QP as index. Each slice can contain modifications of thr2 and thr3 using slice_beta_offset_div2 and thr1 using slice_alpha_c0_offset_div2. The slice parameters 2×slice_beta_offset_div2 and 2×slice_alpha_c0_offset_div2 are added to the current QP index before table lookup of thr2/thr3 and thr1 respectively.

Deblocking in HEVC Draft

Here below $p_0$ to $p_3$ and $q_0$ to $q_3$ represent pixel values across a vertical block boundary.

$p_3 p_2 p_1 p_0 | q_0 q_1 q_2 q_3$

In the draft HEVC specification, the deblocking filter works differently than H.264. The filtering is performed if at least one of the blocks on the side of the border is intra, or has non-zero coefficients, or the difference between the motion vector components of the blocks is greater than or equal to one integer pixel. For example, if one is filtering the border between the blocks A and B below, then the following condition should satisfy for the block boundary to be filtered:

| A | | | | B | | | | (1) |
|---|---|---|---|---|---|---|---|---|
| $p3_0$ | $p2_0$ | $p1_0$ | $p0_0$ | $q0_0$ | $q1_0$ | $q2_0$ | $q3_0$ | |
| $p3_1$ | $p2_1$ | $p1_1$ | $p0_1$ | $q0_1$ | $q1_1$ | $q2_1$ | $q3_1$ | |
| $p3_2$ | $p2_2$ | $p1_2$ | $p0_2$ | $q0_2$ | $q1_2$ | $q2_2$ | $q3_2$ | |
| $p3_3$ | $p2_3$ | $p1_3$ | $p0_3$ | $q0_3$ | $q1_3$ | $q2_3$ | $q3_3$ | |

$dp0 = |p2_0 - 2 \times p1_0 + p0_0|$ $dp3 = |p2_3 - 2 \times p1_3 + p0_3|$ $dq0 = |q2_0 - 2 \times q1_0 + q0_0|$ $dq3 = |q2_3 - 2 \times q1_3 + q0_3|$ $dpq0 = dp0 + dq0$ $dpq3 = dp3 + dq3$ -continued $$dp = dp0 + dp3$$

$$dq = dq0 + dq3$$

The variable d is derived as follows:

$$d = dpq0 + dpq3 \quad (2)$$

The deblocking filtering is performed on the block boundary for lines i=0 . . . 3 if the following condition holds:

$$d < \beta \quad (3)$$

where β depends on QP. In the draft HEVC specification, there is a table, see Table 1 below, for looking up the value of β using QP as the table index. β increases with increasing QP.

TABLE 1

Derivation of threshold variables β and $t_c$ from input QP

| | | | | | | | | QP | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 |
| β | 0 | 0 | 0 | 0 | 0 | 0 | 0 | 0 | 0 | 0 | 0 | 0 | 0 | 0 | 0 | 0 | 6 | 7 | 8 |
| $t_c$ | 0 | 0 | 0 | 0 | 0 | 0 | 0 | 0 | 0 | 0 | 0 | 0 | 0 | 0 | 0 | 0 | 0 | 0 | 1 |

| | | | | | | | | QP | | | | | | | | | | |
|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| $t_c$ | 1 | 1 | 1 | 1 | 1 | 1 | 1 | 1 | 2 | 2 | 2 | 2 | 3 | 3 | 3 | 3 | 4 | 4 | 4 |

| | | | | | | | QP | | | | | | | | | |
|---|---|---|---|---|---|---|---|---|---|---|---|---|---|---|---|---|---|
| | 38 | 39 | 40 | 41 | 42 | 43 | 44 | 45 | 46 | 47 | 48 | 49 | 50 | 51 | 52 | 53 | 54 | 55 |
| β | 38 | 40 | 42 | 44 | 46 | 48 | 50 | 52 | 54 | 56 | 58 | 60 | 62 | 64 | 64 | 64 | 64 | 64 |
| $t_c$ | 5 | 5 | 6 | 6 | 7 | 8 | 9 | 9 | 10 | 10 | 11 | 11 | 12 | 12 | 13 | 13 | 14 | 14 |

If the condition in equation (3) above is fulfilled and filtering is done between blocks A and B, one of two types of filtering (weak or strong filtering) is performed. The choice between the strong and the weak filtering is done separately for each line depending on the following conditions. For lines i=0,3, strong filtering is performed if all the following conditions are true, otherwise, weak filtering is performed:

$$2 \times dpq_i < (\beta >> 2) \quad (4)$$

$$\text{and } (|p3_i - p0_i| + |q0_i - q3_i|) < (\beta >> 3) \quad (5)$$

$$\text{and } |p0_i - q0_i| < ((5 \ast t_c + 1) >> 1), \quad (6)$$

where $t_c$ and β depend on QP as shown in Table 1. The $t_c$ is calculated as $t_c \times (QP+2)$ when A or B has PredMode==MODE_INTRA.

The two filtering modes (weak and strong filtering) in the HEVC draft look like in the following:

Weak Filtering

Weak filtering is performed based on the above conditions. The actual filtering works by computing an offset (Δ) for each of the lines i that the weak filter has been selected for. The following weak filtering procedure is applied for every line, where it has been chosen. In the following algorithm, the variables p0 . . . p2 and q0 . . . q2 are assigned the following values (from row/column i) where p0=$p0_i$, p1=$p1_i$, p2=$p2_i$, q0=$q0_i$, q1=$q_1$i, q2=$q2_i$. One can see that if the weak filtering is performed, one to two pixels are modified at each side of the block boundary:

$$\Delta = (9 \times (q0 - p0) - 3 \times (q1 - p1) + 8) >> 4 \quad (7)$$

if $(abs(\Delta) < 10 \times t_c)$
{
$\Delta = Clip3(-t_c, t_c, \Delta)$
$p0' = Clip1_Y(p0 + \Delta)$
$q0' = Clip1_Y(q0 - \Delta)$
if$(dp < (\beta + (\beta >> 1)) >> 3)$
{
$\Delta p = Clip3(-(tc >> 1), tc >> 1,$
$$\qquad (((p2 + p0 + 1) >> 1) - p1 + \Delta) >> 1)$$
$p1' = Clip1_Y(p1 + \Delta p)$
}

-continued if$(dq < (\beta + (\beta >> 1)) >> 3)$ \quad (8)
{
$$\Delta q = Clip3(-(tc >> 1), tc >> 1, (((q2 + q0 + 1) >> 1) - q1 - \Delta) >> 1)$$
$q1' = Clip1_Y(q1 + \Delta q)$
}
} where Clip is defined as x'=Clip3(A, B, x): x'=x or if x<A x'=A or if x>B x'=B and Clip1$_Y$(x)=Clip3(0, (1<<BitDepth$_Y$)−1, x), where BitDepth$_Y$ is the bit depth, for example 8 or 10.

Strong Filtering

Strong filtering mode is performed for a line i of pixels by the following set of operations, where p0=$p0_i$, p1=$p1_i$, p2=$p2_i$, q0=$q0_i$, q1=$q1_i$, q2=$q2_i$:

p0'=Clip3(p0−2×tc, p0+2×tc,(p2+2×p1+2×p0+2×q0+q1+4)>>3)

p1'=Clip3(p1−2×tc, p1+2×tc,(p2+p1+p0+q0+2)>>2)

p2'=Clip3(p2−2×tc, p2+2×tc,(2×p3+3×p2+p1+p0+q0+4)>>3)

q0'=Clip3(q0−2×tc, q0+2×tc,(p1+2×p0+2×q0+2×q1+q2+4)>>3)

$$q1'=\text{Clip3}(q1-2\times tc,\ q1+2\times tc, (p0+q0+q1+q2+2)>>2)$$

$$q2'=\text{Clip3}(q2-2\times tc,\ q2+2\times tc,\ (p0+q0+q1+3\times q2+2\times q3+4)>>3)$$

The decision for applying a strong deblocking filter in HEVC based on equations (4)-(6) makes sure that the strong deblocking filtering is only applied when the signal on both sides of the block boundary is flat. However, the prior art filter decision of whether to apply strong or weak deblocking filtering has disadvantages in terms of selecting weak deblocking filtering for some blocks and block boundaries even when strong deblocking filtering might be more appropriate. Hence, the prior art filter decision can result in insufficient deblocking filtering, which causes a reduction in subjective and/or objective quality of the picture and video.

SUMMARY

It is a general object to provide an improved deblocking filtering control.

It is a particular object to provide an improved strong filtering decision.

These and other objects are met by embodiment as disclosed herein.

An aspect of the embodiment relates to a deblocking filtering control method. The method comprises checking whether pixel values of four pixels in a line of pixel in a block of pixels form an approximate line. The method also comprises checking whether pixel values of four pixels in the line of pixels in a neighboring block of pixels form an approximate line. The method further comprises selecting to apply strong deblocking filtering to pixel values in the line of pixels in the block of pixels and the neighboring block of pixels if the pixel values of the four pixels in the block of pixels form an approximate line and if the pixel values of the four pixels in the neighboring block of pixels form an approximate line.

Another aspect of the embodiments relates to a filtering control device comprising a determining unit configured to determine whether pixel values of four pixels in a line of pixel in a block of pixels form an approximate line. The determining unit is also configured to determine whether pixel values of four pixels in the line of pixels in a neighboring block of pixels form an approximate line. The filtering control device also comprises a processing unit configured to select to apply strong deblocking filtering to pixel values in the line of pixels in the block of pixels and the neighboring block of pixels if the pixel values of the four pixels in the block of pixels form an approximate line and if the pixel values of the four pixels in the neighboring block of pixels form an approximate line.

Further aspects of the embodiments relate to an encoder comprising a filtering control device according to above, a decoder comprising a filtering control device according to above, a user equipment comprising an encoder and/or a decoder according to above and a network device being or belonging to a network node in a communication network. The network device comprises an encoder and/or a decoder according to above.

Yet another aspect of the embodiments relates to a computer comprising a processing unit and a computer program product comprising a computer program. The computer program comprises code means, which when run on the processing unit, causes the processing unit to check whether pixel values of four pixels in a line of pixels in a block of pixels form an approximate line. The computer program also causes the processing unit to check whether pixel values of four pixels in the line of pixels in a neighboring block of pixels form an approximate line. The computer program further causes the processing unit to select to apply strong deblocking filtering to pixel values in the line of pixels in the block of pixels and the neighboring block of pixels if the pixel values of the four pixels in the block of pixels form an approximate line and if the pixel values of the four pixels in the neighboring block of pixels form an approximate line.

A further aspect of the embodiments relates to a computer program for filtering control. The computer program comprises code means, which when executed by a processing unit, causes the processing unit to check whether pixel values of four pixels in a line of pixels in a block of pixels form an approximate line. The computer program also causes the processing unit to check whether pixel values of four pixels in the line of pixels in a neighboring block of pixels form an approximate line. The computer program further causes the processing unit to select to apply strong deblocking filtering to pixel values in the line of pixels in the block of pixels and the neighboring block of pixels if the pixel values of the four pixels in the block of pixels form an approximate line and if the pixel values of the four pixels in the neighboring block of pixels form an approximate line.

A related aspect of the embodiments relates to a computer program product comprising computer readable code means and a computer program according to above stored on the computer readable code means.

The proposed embodiments improve the subjective and/or objective quality of strong deblocking filtering, such as HEVC strong filtering. The embodiments enable application of strong deblocking filter to areas where the signal in a picture has the form of a gradient or ramp. This enables application of the strong deblocking filtering to the areas where blocking artifacts might otherwise be visible.

BRIEF DESCRIPTION OF THE DRAWINGS

The embodiments, together with further objects and advantages thereof, may best be understood by making reference to the following description taken together with the accompanying drawings, in which:

FIG. 6 is a schematic block diagram of a network node in a communication network according to an embodiment;

FIG. 12 is a flow diagram of an implementation embodiment of the checking steps in FIG. 9;

FIG. 13 is a flow diagram of an implementation embodiment of the filtering control method in FIG. 9;

FIG. 14 is a flow diagram of an optional step and an implementation embodiment of the selecting step in FIG. 13;

FIG. 15 is a schematic block diagram of an implementation embodiment of the determining unit in FIG. 7;

FIGS. 16A-16D illustrate examples of variations in pixel values across a block boundary between a block of pixels and a neighboring block of pixels; and FIG. 17 schematically illustrates a picture of a video sequence with a block of pixels and a neighboring block of pixels separated by a block boundary.

DETAILED DESCRIPTION

Throughout the drawings, the same reference numbers are used for similar or corresponding elements.

The present embodiments generally relate to deblocking filtering and in particular to controlling deblocking filtering over a block boundary or block border between neighboring blocks of pixels in a picture.

Deblocking filters are used to combat blocking artifacts that arise because the pictures in the original video are split into blocks of pixels, which are processed relatively independently. Deblocking filtering is often divided into two types or modes of filtering, generally denoted weak filtering and strong filtering. A strong filter applies, which its name indicate, a stronger filtering of pixel values as compared to a weak filter.

The deblocking filtering decision proposed for HEVC and disclosed in the background section herein makes sure that the strong deblocking filtering is only applied when the signal on both sides of a block boundary is flat. This corresponds to the situation illustrated in FIG. 16A, where the bold line represents the block boundary and the horizontal lines represent the pixel values in a row of pixels in a block of pixels to the left of the block boundary and the pixel values in the row of pixels in a neighboring block of pixels to the right of the block boundary.

However, this means that strong filtering is not applied according to the prior art if the signal on one or both sides of the block boundary has the form of a ramp even if the ramp is smooth. FIGS. 16B and 16C illustrate such situations where the pixel values in a row of pixels form a ramp in both the block of pixels and in the neighboring block of pixels.

This means that the strong deblocking filtering of HEVC is not applied to the smooth areas which have the form of a ramp, e.g. with a gradual change in pixel intensity, as shown in FIGS. 16B and 16C. This in turn results in insufficient deblocking filtering, which causes a reduction in subjective and/or objective quality of the picture and video.

Figure 1:
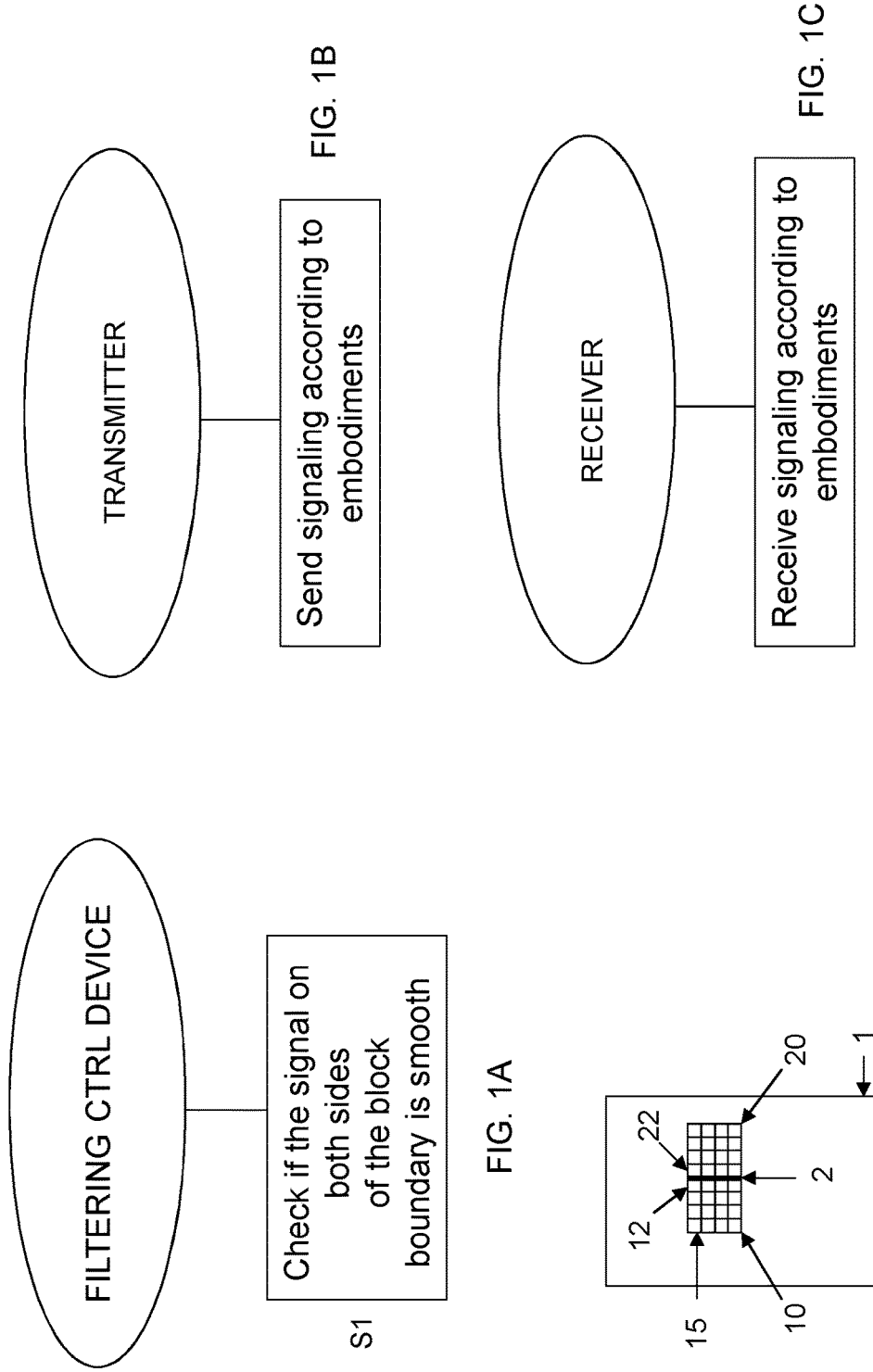
FIGS. 1A-1C illustrate embodiments of methods performed in a filtering control (ctrl) device, a transmitter and a receiver, respectively.

An improvement to the strong deblocking filter decision, in particular for HEVC, is proposed by the embodiments. In particular, the embodiments use the criterion that the signal on both sides of the block boundary is smooth. However, there are no requirements that the signal is flat. Hence, an embodiment involves, as shown in FIG. 1A illustrating a deblocking filter control method performed in a filtering control (ctrl) device. The method comprises checking, in step S1, if the signal on both sides of the block boundary is smooth. In particular, a strong deblocking filtering decision checks or determines whether four pixels on both sides of the block boundary form an approximate line.

Figures 9, 10, 11:
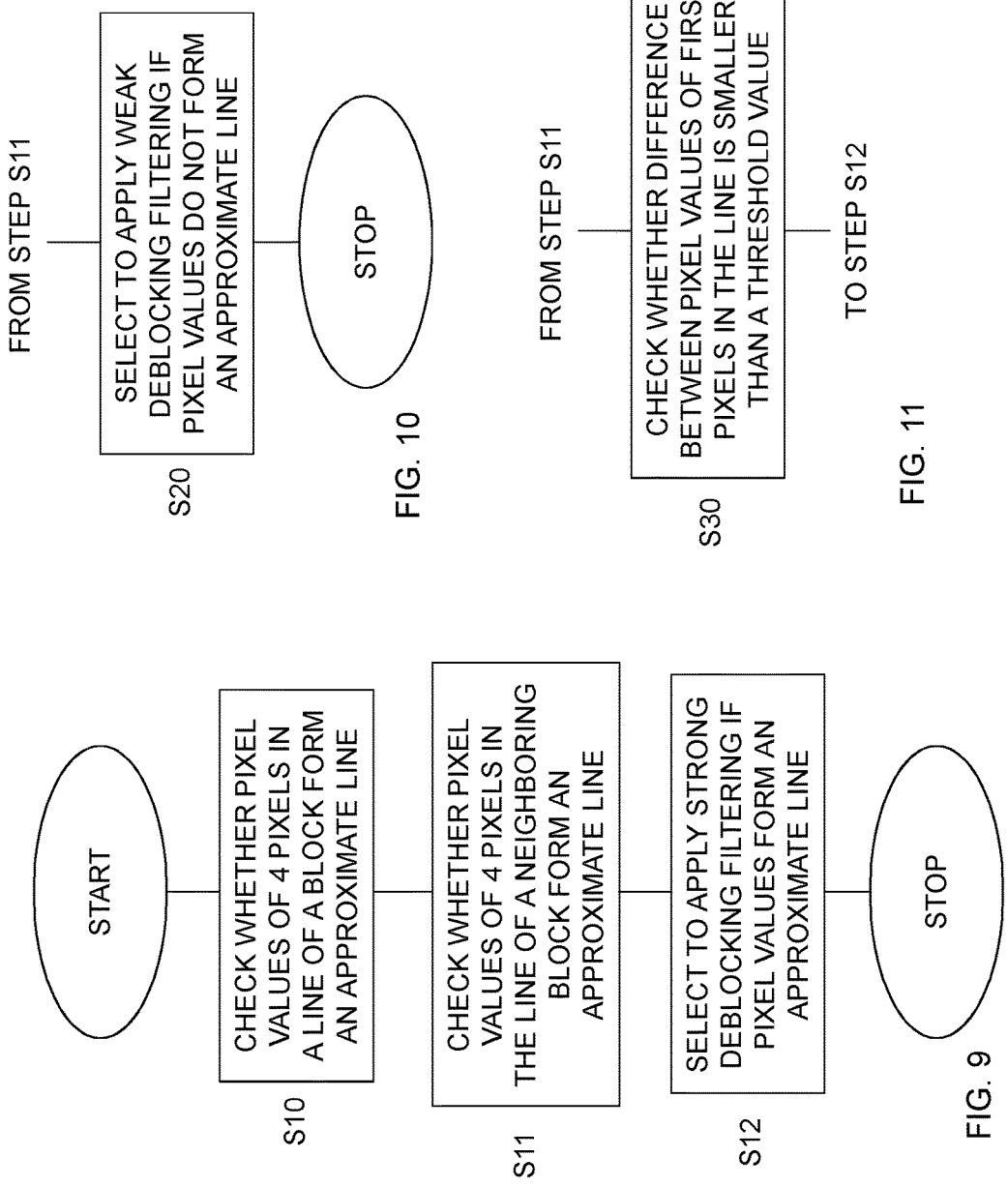
FIG. 9 is a flow diagram of a filtering control method according to an embodiment.
FIG. 10 is a flow diagram of an implementation embodiment of the selecting step in FIG. 9.
FIG. 11 is a flow diagram of an optional step of the filtering control method in FIG. 9.

FIG. 9 illustrates a flow diagram of a deblocking filter control method according to an embodiment. The method starts in step S10 which comprises checking or determining whether pixel values of four pixels in a line of pixels in a block of pixels form an approximate line. Step S11 comprises checking or determining whether pixel values of four pixels in the line of pixels in a neighboring block of pixels form an approximate line. The following step S12 comprises selecting to apply strong deblocking filtering to pixel values in the line of pixels in the block of pixels and the neighboring block of pixels if the pixel values of the four pixels in the block of pixels form an approximate line and if the pixel values of the four pixels in the neighboring block of pixels form an approximate line.

Steps S10 and 311 of FIG. 9 can be performed serially in any order, i.e. S10 prior to step S11 or step S11 prior to step S10. The two steps S10 and S11 can alternatively be performed at least partly in parallel.

In the art, filtering pixel values of pixels in a line of pixels in a block of pixels is sometimes denoted as filtering sample values of samples in a line of samples in a block of samples. Herein, pixel values and pixels are used throughout the description but also encompass alternative notations used in the art, such as sample values and samples. A pixel value (sample value) generally represents a color value of the pixel (sample). Different color formats are available in the art including luminance+chrominance, red+green+blue (RGB) etc. Video coding generally use the color format with one luminance component and two chrominance components for each pixel. Traditionally, luminance component filtering and chrominance component filtering are done separately possibly employing different filtering decisions and different de-blocking filters. The embodiments can be applied to filtering the luminance component, filtering a chrominance component or filtering both the luminance component and a chrominance component. In a particular embodiment, the embodiments are applied to achieve luminance or luma filtering. Hence, in a particular embodiment a pixel value (sample value) represents a luminance value.

FIG. 17 schematically illustrates a picture 1, such a picture 1 of a video sequence, in which the pixels 12, 22 have been divided into blocks 10, 20 of pixels 12, 22. The figure also shows a block boundary or border 2 between the block 10 of pixels 12 and its neighboring block 20 of pixels 22. Hence, the block 10 of pixels 12 and the neighboring block 20 of pixels 22 are two adjacent blocks 10, 20 of pixels 12, 22 in the picture 1 and are separate by the block boundary 2. FIG. 17 illustrates the case where the two blocks 10, 20 of pixels 12, 22 are positioned next to each other in the picture 1 and the block boundary 2 therefore is a vertical block boundary. In an alternative approach, the two blocks 10, 20 of pixels 12, 22 are positioned in the picture 1 with one of the blocks 10, 20 of pixels 12, 22 positioned above the other block of pixels. In this alternative approach the block boundary 2 is a horizontal block boundary.

Step S10 of FIG. 9 checks whether pixel values of four pixels 12 in a line 15 of pixels 12, 22 in the block 10 of pixels 12 form an approximate line. This line 15 of pixels 12, 22 is either a row of pixels 12, 22 as shown in FIG. 17 for a vertical block boundary 2 or a column of pixels 12, 22 for a horizontal block boundary. The row or column of pixels 12, 22 extend over the vertical or horizontal block boundary 2 to pass over and encompass both pixels 12 in the block 10 of pixels 12 and pixels 22 in the neighboring block 20 of pixels 22.

Step S11 correspondingly checks whether pixel values of four pixels 22 in the line 15 of pixels 12, 22 in the neighboring block 20 of pixels 22 form an approximate line. The pixel values checked or investigated in steps S10 and S11 thereby belong to the same line 15 of pixels 12, 22 but belong to different blocks 10, 20 of pixels 12, 22 in the picture 1.

In a particular approach, the pixel values of the four pixels 12, 22 checked in steps S10 and S11 are the pixel values of the four pixels 12, 22 closest to the block boundary 2 in the line 15 of pixels 12, 22 in the two blocks 10, 20 of pixels 12, 22. Generally, the pixel value of pixel number j relative to, i.e. counting from, the block boundary 2 in line number i in the block 10 of pixels 12 is denoted $pj_i$ herein. The corresponding pixel value of pixel number j relative to the block boundary 2 in line number i in the neighboring block 20 of pixels 22 is denoted $qj_i$. In such a case, step S10 preferably comprises checking whether pixel values $p0_i$, $p1_i$, $p2_i$ and $p3_i$ in line number i form an approximate line and step S11 preferably comprises checking whether pixel values $q0_i$, $q1_i$, $q2_i$ and $q3_i$ in line number i form an approximate line for at least one selected value of i. In an embodiment, in particular applicable to HEVC, i=0 or 3 or i=0 . . . 3.

If the pixel values of the four pixels 12, 22 in the line 15 of pixels 12, 22 in both the block 10 of pixels 12 and the neighboring block 20 of pixels 22 form an approximate line as checked in steps S10 and S11 step S12 of FIG. 9 comprises selecting to apply strong deblocking filtering to pixel values in the line of pixels 12, 22 in both blocks 10, 20 of pixels 12, 22.

The deblocking filter control method of FIG. 9 thereby selects to apply strong deblocking filtering for all of the situations shown in FIGS. 16A to 16C, whereas the prior art filter decisions of HEVC will only select strong deblocking filtering for the situation in FIG. 16A but not in FIGS. 16B and 16C.

Hence, the embodiments not only select to apply strong deblocking filtering if the pixels values in the line 15 of pixels 12, 22 for an approximate flat or horizontal line, as in FIG. 16A, but also select to apply strong deblocking filtering if pixel values in the line 15 of pixels 12, 22 form a ramp, as in FIGS. 16B and 16C. In FIG. 16B the pixel values form an approximately continuous ramp when traveling along the line 15 of pixels 12, 22 over the block boundary 2. FIG. 16C illustrates an alternative approach in which the four pixel values in the line 15 of pixels 12, 22 in the block 10 of pixels 12 form a ramp and the four pixel values in the line 15 of pixels 12, 22 in the neighboring block 20 of pixels 22 form a ramp, which may have a different slope as compared to the ramp in the block 10 of pixels 12. The embodiments also select to apply strong deblocking filtering if the four pixel values in the line 15 of pixels 12, 22 form an approximate flat or horizontal line in one of the two blocks 10, 20 of pixels 12, 22 and the four pixel values in the line 15 of pixels 12, 22 form an approximate ramp in the other of the two blocks 10, 20 of pixels 12, 22.

In a particular embodiment, step 310 of FIG. 9 thereby comprises checking or determining whether the pixel values of the four pixels 12 in the line 15 of pixels 12, 22 in the block 10 of pixels 12 form a flat line or ramp, or at least form an approximate flat line or ramp. Correspondingly, step S11 then comprises checking or determining whether the pixel values of the four pixels 22 in the line 15 of pixels 12, 22 in the neighboring block 20 of pixels 22 form a flat line or ramp, or at least form an approximate flat line or ramp. Step S12 preferably comprises, in this particular embodiment, selecting to apply strong deblocking filtering if the pixel values of the four pixels 12 in the block 10 of pixels 12 form a flat line or a ramp, or at least an approximate flat line or ramp, and if the pixel values of the four pixels 22 in the neighboring block 20 of pixels 22 form a flat line or a ramp, or at least an approximate flat line or ramp.

FIG. 10 is a flow diagram illustrating an optional step of the deblocking filter control method of FIG. 9 if the condition in step S12 is not met. The method then continues from step S11 in FIG. 9. Step S20 comprises selecting to apply weak deblocking filtering to pixel values in the line 15 of pixels 12, 22 in the block 10 of pixels 12 and the neighboring block 20 of pixels 22 if the pixel values of the four pixels 12 in the block 10 of pixels 12 do not form an approximate line and/or if the pixel values of the four pixels 22 in the neighboring block 20 of pixels 22 do not form an approximate line.

Hence, if the four pixel values on at least one of the sides of the block boundary 2 do not form an approximate line, such as a flat line or a ramp, then strong deblocking filtering is not appropriate for the pixel values in the current line 15 of pixels 12, 22. In clear contrast, weak deblocking filtering is instead selected in step S20. The reason being that it is likely that there will be a structure in the line 2 of pixels 12, 22, such as an edge between two different objects or areas in the picture 1 or a highly detailed texture. This edge or texture should thereby not be filtered away during the deblocking filtering. Accordingly, a weak deblocking filter is more appropriate as compared to using a strong deblocking filter.

Weak filtering is preferably performed as disclosed in the section weak filtering for HEVC in the background section and strong filtering may be performed as disclosed in the background section under section strong filtering for HEVC.

In an embodiment, at least one additional criterion is used to discriminate between selecting to apply strong deblocking filtering and weak deblocking filtering. An additional check to make sure that there is no large step between the pixel values of the block boundary 2 can thereby also be used. This check makes sure that the difference between the pixel values on both sides of the block boundary 2 is not due to a natural edge in the original signal.

This situation is illustrated in FIG. 16D. In this figure the four pixel values in the line 15 of pixels 12, 22 form a ramp and thereby an approximate line on either side of the block boundary 2. However, there is a significant difference in pixel value of the pixel 12 closest to the block boundary 2 in the block 10 of pixels 12 and the pixel value of the pixel 22 closest to the block boundary 2 in the neighboring block 20 of pixels 22. Hence, when traveling along the line 15 of pixels 12, 22 there is a significant step or jump in pixel values at the block boundary 2. This step may be due to a natural edge between different objects or areas in the picture.

A particular embodiment of the deblocking filter control method thereby comprises an additional step S30 as shown in FIG. 11 to identify a situation similar to the one shown in FIG. 16D. The method continues from step S11 of FIG. 9 but could alternatively continue from step S10 or indeed the method could start with step S30. This step S30 comprises checking or determining whether a difference between i) a pixel value of a first pixel 12, relative to the block boundary 2 between the block 10 of pixels 12 and the neighboring block 20 of pixels 22, in the line 15 of pixels 12, 22 in the block of pixels 12 and ii) a pixel value of a first pixel 22, relative to the block boundary 2, in the line 15 of pixels 12, 22 in the neighboring block 20 of pixels 22 is smaller than a threshold value.

The method then continues back to FIG. 9 where step S12 comprises selecting to apply strong deblocking filtering if the pixel values of the four pixels 12 in the block 10 of pixels 12 form an approximate line, if the pixel values of the four pixels 22 in the neighboring block 20 of pixels 22 form an approximate line and if the difference checked in step S30 is smaller than the threshold value.

This means that step S30 checks the difference $p0_i - q0_i$ and in particular checks whether such a difference is smaller than a threshold value.

This embodiment combining FIG. 9 and FIG. 11 is able to differentiate a situation with a larger step at the block boundary 2 due to a natural edge, see FIG. 16D, from a situation where there is a smaller step at the block boundary 2, see FIGS. 16A to 16C, likely because of a block artifact.

It is proposed, in an embodiment, to use a combination of the strong filtering decision from (4) in the background section, which checks that the first three pixels 12, 22 from the block boundary 2 form a straight line, e.g. a flat line or a ramp, or some similar decision that checks that the first three pixels 12, 22 from the block boundary 2 form a line. Another criterion checks that the values of the second, the third and the fourth pixels also form a straight line. For example, checking that pixels $p1_i$, $p2_i$ and $p3_i$ approximately form a straight line, e.g. a ramp, in addition to check that the pixels $p0_i$ $p1_i$ and $p2_i$ form a straight line, e.g. a ramp, makes sure that all four pixels $p0_i$, $p1_i$, $p2_i$ and $p3_i$ form an approximately straight line. If the same criterion also holds for pixels $q0_i$, $q1_i$, $q2_i$ and $q3_i$ then the strong deblocking filter can be applied. In addition, a criterion similar to the one from (6) in the background section can be applied to make sure that the step at the block boundary 2 is not a natural edge, i.e. that the absolute difference between the pixel values is below a certain threshold.

FIG. 12 is a flow diagram illustrating an example of steps S10 and S11 according to this embodiment. The method starts in step S40, which comprises checking or determining whether pixel values of a first pixel 12, a second pixel and a third pixel, relative to the block boundary 2 between the block 10 of pixels 12 and the neighboring block 20 of pixels 22, in the line 15 of pixels 12, 22 in the block 10 of pixels 12 form an approximate line. Step S41 comprises checking or determining whether pixel values of the second pixel, the third pixel and a fourth pixel, relative to the block boundary 2, in the line 15 of pixels 12, 22 in the block 10 of pixels 12 form an approximate line. Step S41 comprises checking or determining whether pixel values of a first pixel 22, a second pixel and a third pixel, relative to the block boundary 2, in the line 15 of pixels 12, 22 in the neighboring block 20 of pixels 22 form an approximate line. Finally, step S42 comprises checking or determining whether pixel values of the second pixel, the third pixel and a fourth pixel, relative to the block boundary 2, in the line 15 of pixels 12, 22 in the neighboring block 20 of pixels 22 form an approximate line.

Steps S40 to S43 can be performed serially in any order or at least partly in parallel.

The method then continues to step S12 of FIG. 9. In this embodiment step S12 comprises selecting to apply strong deblocking filtering if the pixel values of the first pixel 12, the second pixel and the third pixel in the block 10 of pixels form an approximate line, if the pixel values of the second pixel, the third pixel and the fourth pixel in the block 10 of pixels 12 form an approximate line, if the pixel values of the first pixel 22, the second pixel and the third pixel in the neighboring block 20 of pixels 22 form an approximate line and if the pixel values of the second pixel, the third pixel and the fourth pixel in the neighboring block 20 of pixels 22 form an approximate line.

FIG. 13 is a flow diagram illustrating a particular implementation example of the deblocking filter control method. The method starts in step S50, which comprises calculating $dp_i = |p2_i - 2 \times p1_i + p0_i|$. A next step S51 comprises calculating $dp_i\_side = |p3_i - 2 \times p2_i + p1_i|$. The following step S52 comprises calculating $dq_i = |q2_i - 2 \times q1_i + q0_i|$ and step S53 comprises calculating $dq_i\_side = |q3_i - 2 \times q2_i + q1_i|$.

Steps S50 to S53 can be performed serially in any or order or at least partly in parallel.

As previously disclosed herein wherein $p0_i$ denotes a pixel value of the first pixel 12 in the line 15 of pixels 12, 22 in the block 10 of pixels 12, $p1_i$ denotes a pixel value of the second pixel in the line 15 of pixels 12, 22 in the block 10 of pixels 12, $p2_i$ denotes a pixel value of the third pixel in the line 15 of pixels 12, 22 in the block 10 of pixels 12, $p3_i$ denotes a pixel value of the fourth pixel in the line 15 of pixels 12, 22 in the block 10 of pixels 12, $q0_i$ denotes a pixel value of the first pixel 22 in the line 15 of pixels 12, 22 in the neighboring block 20 of pixels 22, $q1_i$ denotes a pixel value of the second pixel in the line 15 of pixels 12, 22 in the neighboring block 20 of pixels 22, $q2_i$ denotes a pixel value of the third pixel in the line 15 of pixels 12, 22 in the neighboring block 20 of pixels 22 and $q3_i$ denotes a pixel value of the fourth pixel in the line 15 of pixels 12, 22 in the neighboring block 20 of pixels 22.

The method the continues to step S54, which comprises selecting to apply strong deblocking filtering if $(dp_i+dq_i)$<Thr1 and $(dp_i\_side+dq_i\_side)$<Thr2, wherein Thr1 denotes a first threshold value and Thr2 denotes a second threshold value. Hence, if the sum of the parameter values calculated in steps S50 and S52 based on the three first pixel values in the line 15 of pixels 12, 22 on either side of the block boundary 2 is smaller than a first threshold value and if the sum of the parameter values calculated in steps S51 and S53 based on the second to fourth pixel values in the line 15 of pixels 12, 22 on either side of the block boundary 2 is smaller than a second threshold value strong deblocking filtering is selected in step S54. The method then continues to step S55, where strong deblocking filter is applied to pixel values in the line 15 of pixels 12, 22, such as disclosed in the background section. However, if $(dp_i+dq_i)\geq$Thr1 and/or $(dp_i\_side+dq_i\_side)\geq$Thr2 the method instead continues from step S54 to step S56. This step S56 comprises applying weak deblocking filter to pixel values in the line of pixels 12, 22, such as disclosed in the background section.

If the pixel values of the four pixels 12 in the line 15 of pixels 12, 22 in the block 10 of pixels 12 and in the neighboring block 20 of pixels 22 form a flat line then $p0_i = p1_i = p2_i = p3_i$ and $q0_i = q1_i = q2_i = q3_i$. This in turn implies that $dp_i = 0$, $dq_i = 0$, $dp_i\_side = 0$ and $dq_i\_side = 0$. Accordingly, the sums $(dp_i+dq_i)$ and $(dp_i\_side+dq_i\_side)$ will also be zero. Correspondingly, if the pixel values for a ramp, for instance $p0_i=4$, $p1_i=3$ $p2_i=2$ $p3_i=1$ and $q0_i=6$, $q1_i=7$, $q2_i=8$ and $q3_i=9$ then $dp_i=0$, $dq_i=0$, $dp_i\_side=0$ and $dq_i\_side=0$ and also the sums $(dp_i+dq_i)$ and $(dp_i\_side+dq_i\_side)$ will be zero.

A particular embodiment of step S54 comprises selecting to apply strong deblocking filtering if $2\times(dp_i+dq_i)<(\beta>>2)$ and $2\times(dp_i\_side+dq_i\_side)<(R>>2)$, wherein >> represents a right shift operator defined as $$a \gg b = \left\lfloor \frac{a}{2^b} \right\rfloor$$

and $\lfloor c \rfloor$ is a largest integer not greater than c and $\beta$ is a parameter that depends on a quantization parameter value associated with the block 10 of pixels 12. Hence, in this embodiment Thr1=$(\beta>>2)/2$ and Thr2=$(\beta>>2)/2$.

$2\times(dp_i+dq_i)<(\beta>>2)$ is equivalent to $((dp_i+dq_i)<<1)<(\beta>>2)$, wherein << represents a left shift operator defined as $a<<b=a>2^b$. Correspondingly, $2\times(dp_{i\_side}+dq_{i\_side})<(\beta>>2)$ is equivalent to $((dp_{i\_side}+dq_{i\_side})<<1)<(\beta>>2)$.

The embodiment discussed above and disclosed in FIG. 13 can optionally be combined with an additional criterion to identify a step in pixel values at the block boundary 2. Such an approach is shown in FIG. 14. The method then continues from step S54 in FIG. 13. A next step S60 comprises calculating $|p0_i-q0_i|$.

This step S60 can be performed serially relative to or at least partly in parallel with any of the steps S50 to S53.

The method then continues to step S61, which comprises selecting to apply strong deblocking filtering if $(dp_i+dq_i)$<Thr1, $(dp_{i\_}side+dq_{i\_}side)$<Thr2 and $|p0_i-q0_i|$<Thr3, wherein Thr3 denotes a third threshold value.

In a particular embodiment Thr3 is $((5\times t_c+1)>>1)$, wherein $t_c$ is a parameter that depends on the quantization parameter value associated with the block 10 of pixels 12. Step S61 preferably comprises, in this particular embodiment, selecting to apply strong deblocking filtering if $2\times(dp_i+dq_i)<(\beta>>2)$, $2\times(dp_{i\_}side+dq_{i\_}side)<(\beta<<2)$ and $|p0_i-q0_i|<((5\times t_c+1)>>1)$.

In another particular embodiment Thr3 is $(t_c<<4)$. Step S61 preferably comprises, in this particular embodiment, selecting to apply strong deblocking filtering if $2\times(dp_i+dq_i)<(\beta>>2)$, $2\times(dp_{i\_}side+dq_{i\_}side)<(\beta>>2)$ and $|p0_i-q0_i|<(t_c<<4)$.

If strong deblocking filtering is selected in step S61 the method continues to step S55 of FIG. 13 otherwise the method continues to step S56 of FIG. 13.

The values of the parameters $\beta$ and $t_c$ can, for instance, be obtained from Table 1 using the quantization parameter (QP) value of the block 10 of pixels 12 as input.

In the foregoing, the deblocking filter control method has been discussed applied to a line 15 of pixels 12, 22 across a block boundary 2. This line 15 of pixels 12, 22 has been denoted line number i. The decision to apply strong or weak deblocking filtering of embodiments could be applied to any line 15 of pixels 12, 22 in the block 10 of pixels 12. For instance, if the block 10 of pixels 12 comprises four lines 15 of pixels 12, 22 as shown in FIG. 17, i.e. i=0 . . . 3, the filter decision could be applied to any of these lines i=0 . . . 3. Alternatively, the selection between strong and weak deblocking filtering is only applicable to a subset of the lines 15 of pixels 12, 14. For instance, the filter decision could be applied to line number i=0 and line number i=3. In such a case, strong deblocking filtering is typically never applied and thereby not available for the remaining lines 15 of pixels 12, 22 in the block 10 of pixels 12, i.e. for line number i=1 and line number i=2. In yet another approach, the filter decision is only applied to one of the lines, for instance line number i=0, or line number i=1, or line number i=2 or line number i=3. In an embodiment adapted for HEVC the filter decision is applied to the line number i=0 and the line number i=3 and strong deblocking filtering is applied if the decision to apply strong deblocking filtering holds for both these lines.

In particular embodiments, the filtering decision is performed as described in the following.

Let the following values be defined as below $$dp0\_side=|p3_0-2\times p2_0+p1_0| \quad (9)$$

$$dp3\_side=|p3_3-2\times p2_3+p1_3|$$

$$dq0\_side=|q3_0-2\times q2_0+q1_0|$$

$$dq3\_side=|q3_3-2\times q2_3+q1_3|$$

and the values dp0, dp3, dq0, dq3, dpq0, dpq3, dp, dq are derived as in equations (1) in the background section.

First, a condition in equation (4) or a similar condition, which checks that the first three pixels 12, 22 from the block boundary 2 form a straight line, is checked.

In addition to that, the condition from equation (6) that the change between first two pixels 12, 22 closest to the block boundary 2 is below a certain threshold may additionally be evaluated.

A criterion for application of the strong filtering includes comparing the calculated values of at least dp0_side and dq0_side with the corresponding threshold value(s). Alternatively, a sum of values dp0_side and dq0_side can be used in a comparison.

The strong filtering decisions can be done based on one or more lines 15 across the block boundary 2. For example, the decisions based on lines 0 and 3 can be used. In this case, the decision to apply the strong filter is done based on fact that the strong deblocking filtering criteria for both line 0 and line 3 holds. Alternatively a sum of the values dp0_side, dp3_side, dq0_side and dq3_side can be used. The respective values for other lines 15 than 0 and 3 can be used. The strong filtering decision can be performed separately for each line 15 or for a set of lines 15 across the block boundary 2 based on a subset of line 15 across the block boundary 2.

FIGS. 1B and 10 are flow diagrams illustrating embodiments performed in a transmitter and a receiver, respectively. FIG. 1B involves sending signaling according to the embodiments and FIG. 10 correspondingly involves receiving signaling according to the embodiments.

EMBODIMENTS

The embodiments below are the examples of the proposed strong filtering decisions. These examples are, however, not restrictive. For example, different values of thresholds can be used. Moreover, the criteria for the strong filtering decision can also be used in combination with some other criteria for the strong filtering to be applied.

Embodiment 1

An example of the proposed strong filtering decisions are shown below $$dp0=|p2_0-2\times p1_0+p0_0| \quad (1)$$

$$dp3=|p2_3-2\times p1_3+p0_3|$$

$$dq0=|q2_0-2\times q1_0+q0_0|$$

$$dq3=|q2_3-2\times q1_3+q0_1|$$

$$dp0\_side=|p3_0-2\times p2_0+p1_0| \quad (9)$$

$$dp3\_side=|p3_3-2\times p2_3+p1_3|$$

$$dq0\_side=|q3_0-2\times q2_0+q1_0|$$

$$dq3\_side=|q3_3-2>q2_3+q1_3|$$

The strong filtering is applied if every of the following conditions holds:

$$dp0+dq0<Thr1$$

$$dp0\_side+dq0\_side<Thr2$$

$$|p0_0-q0_0|<Thr3$$

Here the values of Thr1, Thr2 and Thr3 depend on the quantization parameter (QP) and may be derived from the look-up tables.

Embodiment 2

Another embodiment of the proposed strong filter decision is shown below. Here the values of dp0_side and dq0_side are evaluated separately.

$$dp0 = |p2_0 - 2 \times p1_0 + p0_0| \quad (1)$$

$$dp3 = |p2_3 - 2 \times p1_3 + p0_3|$$

$$dq0 = |q2_0 - 2 \times q1_0 + q0_0|$$

$$dq3 = |q2_3 - 2 \times q1_3 + q0_3|$$

$$dp0\_side = |p3_0 - 2 \times p2_0 + p1_0| \quad (9)$$

$$dp3\_side = |p3_3 - 2 \times p2_3 + p1_3|$$

$$dq0\_side = |q3_0 - 2 \times q2_0 + q1_0|$$

$$dq3\_side = |q3_3 - 2 \times q2_3 + q1_3|$$

The strong filtering is applied if every of the following conditions holds:

$$dp0 + dq0 < Thr1$$

$$dp0\_side < Thr2$$

$$dq0\_side < Thr2$$

$$|p0_0 - q0_0| < Thr3$$

Here the values of Thr1, Thr2 and Thr3 depend on the quantization parameter (QP) and may be derived from the look-up tables.

Embodiment 3

An example of the proposed strong filter decision, where the conditions are evaluated separately is given below.

$$dp0 = |p2_0 - 2 \times p1_0 + p0_0| \quad (1)$$

$$dp3 = |p2_3 - 2 \times p1_3 + p0_3|$$

$$dq0 = |q2_0 - 2 \times q1_0 + q0_0|$$

$$dq3 = |q2_3 - 2 \times q1_3 + q0_3|$$

$$dp0\_side = |p3_0 - 2 \times p2_0 + p1_0| \quad (9)$$

$$dp3\_side = |p3_3 - 2 \times p2_3 + p1_3|$$

$$dq0\_side = |q3_0 - 2 \times q2_0 + q1_0|$$

$$dq3\_side = |q3_3 - 2 \times q2_3 + q1_3|$$

The strong filtering is applied if every of the following conditions holds:

$$dp0 < Thr1$$

$$dq0 < Thr1$$

$$dp0\_side < Thr2$$

$$dq0\_side < Thr2$$

$$|p0_0 - q0_0| < Thr3$$

Here the values of Thr1, Thr2 and Thr3 depend on the quantization parameter (QP) and may be derived from the look-up tables.

Embodiment 4

An example of the proposed strong filter decision, the criteria can be used based on more than one line, for example, line 0 and line 3 is shown below.

$$dp0 = |p2_0 - 2 \times p1_0 + p0_0| \quad (1)$$

$$dp3 = |p2_3 - 2 \times p1_3 + p0_3|$$

$$dq0 = |q2_0 - 2 \times q1_0 + q0_0|$$

$$dq3 = |q2_3 - 2 \times q1_3 + q0_3|$$

$$dp0\_side = |p3_0 - 2 \times p2_0 + p1_0| \quad (9)$$

$$dp3\_side = |p3_3 - 2 \times p2_3 + p1_3|$$

$$dq0\_side = |q3_0 - 2 \times q2_0 + q1_0|$$

$$dq3\_side = |q3_3 - 2 \times q2_3 + q1_3|$$

The strong filtering is applied if every of the following conditions holds:

$$dp0 + dq0 < Thr1$$

$$dp0\_side + dq0\_side < Thr2$$

$$|p0_0 - q0_0| < Thr3$$

$$dp3 + dq3 < Thr1$$

$$dp3\_side + dq3\_side < Thr2$$

$$|p0_3 - q0_3| < Thr3$$

Pixel values from some other lines than 0 and 3, e.g. line 1 and 2, can be used.

Here the values of Thr1, Thr2 and Thr3 depend on the quantization parameter (QP) and may be derived from the look-up tables.

Embodiment 5

In this embodiment, a check for the maximum allowed distance between pixels closest to the block boundary is not used.

$$dp0 = |p2_0 - 2 \times p1_0 + p0_0| \quad (1)$$

$$dp3 = |p2_3 - 2 \times p1_3 + p0_3|$$

$$dq0 = |q2_0 - 2 \times q1_0 + q0_0|$$

$$dq3 = |q2_3 - 2 \times q1_3 + q0_3|$$

$$dp0\_side = |p3_0 - 2 \times p2_0 + p1_0| \quad (9)$$

$$dp3\_side = |p3_3 - 2 \times p2_3 + p1_3|$$

$$dq0\_side = |q3_0 - 2 \times q2_0 + q1_0|$$

$$dq3\_side = |q3_3 - 2 \times q2_3 + q1_3|$$

The strong filtering is applied if every of the following conditions holds:

$$dp0 + dq0 < Thr1$$

$$dp0\_side + dq0\_side < Thr2$$

$dp3+dq3<Thr1$ $dp3\_side+dq3\_side<Thr2$

Pixel values from some other lines than 0 and 3, e.g. line 1 and 2, can be used.

Here the values of Thr1 and Thr2 depend on the quantization parameter (QP) and may be derived from the look-up tables.

Embodiment 6

An example of the proposed strong filter decision with the values of the thresholds is given.

$$dp0=|p2_0-2\times p1_0+p0_0| \quad (1)$$

$$dp3=|p2_3-2\times p1_3+p0_3|$$

$$dq0=|q2_0-2\times q1_0+q0_0|$$

$$dq3=|q2_3-2\times q1_3+q0_3|$$

$$dp0\_side=|p3_0-2\times p2_0+p1_0| \quad (9)$$

$$dp3\_side=|p3_3-2\times p2_3+p1_3|$$

$$dq0\_side=|q3_0-2\times q2_0+q1_0|$$

$$dq3\_side=|q3_3-2\times q2_3+q1_3|$$

The strong filtering is applied if every of the following conditions holds:

$$2\times(dp0+dq0)<(beta>>2)$$

$$2\times(dp0\_side+dq0\_side)<(beta>>2)$$

$$|p0_0-q0_0|<(tc<<4)$$

$$2\times(dp3+dq3)<(beta>>2)$$

$$2\times(dp3\_side+dq3\_side)<(beta>>2)$$

$$|p0_3-q0_3|<(tc<<4)$$

This is equivalent to:

$$2\times(dp0+dq0)<(beta>>2)$$

$$((dp0\_side+dq0\_side)<<1)<(beta>>2)$$

$$|p0_0-q0_0|(tc<<4)$$

$$2\times(dp3+dq3)<(beta>>2)$$

$$((dp3\_side+dq3\_side)<<1)<(beta>>2)$$

$$|p0_3-q0_3|<(tc<<4)$$

Pixel values from some other lines than 0 and 3, e.g. line 1 and 2, can be used.

Here the values of beta and tc depend on the quantization parameter (QP) and may be derived from the look-up tables.

Embodiment 7

An example of the proposed strong filter decisions with the values of the thresholds is given.

$$dp0=|p2_0-2\times p1_0+p0_0| \quad (1)$$

$$dp3=|p2_3-2\times p1_3+p0_3|$$

$$dq0=|q2_0-2\times q1_0+q0_0|$$

$$dq3=|q2_3-2\times q1_3+q0_3|$$

$$dp0\_side=|p3_0-2\times p2_0+p1_0| \quad (9)$$

$$dp3\_side=|p3_3-2\times p2_3+p1_3|$$

$$dq0\_side=|q3_0-2\times q2_0+q1_0|$$

$$dq3\_side=|q3_3-2\times q2_3+q1_3|$$

The strong filtering is applied if every of the following conditions holds:

$$dp0+dq0<(beta>>3)$$

$$dp0\_side+dq0\_side<(beta>>3)$$

$$|p0_0-q0_0|<(tc<<4)$$

$$(dp3+dq3)<(beta>>3)$$

$$(dp3\_side+dq3\_side)<(beta>>3)$$

$$|p0_3-q0_3|<(tc<<4)$$

Pixel values from some other lines than 0 and 3, e.g. line 1 and 2, can be used.

Here the values of beta and tc depend on the quantization parameter (QP) and may be derived from the look-up tables.

Embodiment 8

An example of the proposed strong filter decision with suggested values of the thresholds is given.

$$dp0=|p2_0-2\times p1_0+p0_0| \quad (1)$$

$$dp3=|p2_3-2\times p1_3+p0_3|$$

$$dq0=|q2_0-2\times q1_0+q0_0|$$

$$dq3=|q2_3-2\times q1_3+q0_3|$$

$$dp0\_side=|p3_0-2\times p2_0+p1_0| \quad (9)$$

$$dp3\_side=|p3_3-2\times p2_3+p1_3|$$

$$dq0\_side=|q3_0-2\times q2_0+q1_0|$$

$$dq3\_side=|q3_3-2\times q2_3+q1_3|$$

The strong filtering is applied if every of the following conditions holds:

$$dp0+dq0<(beta>>3)$$

$$dp0\_side<(beta>>4)$$

$$dq0\_side<(beta>>4)$$

$$|p0_0-q0_0|<(tc<<4)$$

$$(dp3+dq3)<(beta>>3)$$

$$dp3\_side<(beta>>4)$$

$$dq3\_side<(beta>>4)$$

$$|p0_3-q0_3|<(tc<<4)$$

Pixel values from some other lines than 0 and 3, e.g. line 1 and 2, can be used.

Here the values of beta and tc depend on the quantization parameter (QP) and may be derived from the look-up tables.

Embodiment 9

An example of the proposed strong filter decision with suggested values of the thresholds is given.

$$dp0=|p2_0-2\times p1_0+p0_0| \quad (1)$$

$$dp3=|p2_3-2\times p1_3+p0_3|$$

$$dq0=|q2_0-2\times q1_0+q0_0|$$

$$dq3=|q2_3-2\times q1_3+q0_3|$$

$$dp0\_side=|p3_0-2\times p2_0+p1_0| \quad (9)$$

$$dp3\_side=|p3_3-2\times p2_3+p1_3|$$

$$dq0\_side=|q3_0-2\times q2_0+q1_0|$$

$$dq3\_side=|q3_3-2\times q2_3+q1_3|$$

The strong filtering is applied if every of the following conditions holds:

$$dp0+dq0+dp3+dq3<Thr1$$

$$dp0\_side+dq0\_side+dp3\_side+dq3\_side<Thr2$$

$$|p0_0-q0_0|<Thr3$$

$$|p0_3-q0_3|<Thr3$$

Pixel values from some other lines than 0 and 3, e.g. line 1 and 2, can be used.

Here the values of Thr1, Thr2 and Thr3 depend on the quantization parameter (QP) and may be derived from the look-up tables.

Embodiment 10

An example of the proposed strong filter decision with suggested values of the thresholds is given.

$$dp0=|p2_0-2\times p1_0+p0_0| \quad (1)$$

$$dp3=|p2_3-2\times p1_3+p0_3|$$

$$dq0=|q2_0-2\times q1_0+q0_0|$$

$$dq3=|q2_3-2\times q1_3+q0_3|$$

$$dp0\_side=|p3_0-2\times p2_0+p1_0| \quad (9)$$

$$dp3\_side=|p3_3-2\times p2_3+p1_3|$$

$$dq0\_side=|q3_0-2\times q2_0+p1_0|$$

$$dq3\_side=|q3_3-2\times q2_3+q1_3|$$

The strong filtering is applied if every of the following conditions holds:

$$dp0+dq0+dp3+dq3<Thr1$$

$$dp0\_side+dq0\_side+dp3\_side+dq3\_side<Thr2$$

$$|p0_0-q0_0|+|p0_3-q0_3|<Thr3$$

Pixel values from some other lines than 0 and 3, e.g. line 1 and 2, can be used.

Here the values of Thr1, Thr2 and Thr3 depend on the quantization parameter (QP) and may be derived from the look-up tables.

Embodiment 11

An example of the proposed strong filtering decisions are shown below $$dpi=|p2_i-2\times p1_i+p0_i|$$

$$dqi=|q2_i-2\times q1_i+q0_i|$$

$$dpi\_side=|p3_i-2\times p2_i+p1_i|$$

$$dqi\_side=|q3_i-2\times q2_i+q1_i|$$

The strong filtering is applied to line number i if every of the following conditions holds:

$$dpi+dqi<Thr1$$

$$dpi\_side+dqi\_side<Thr2$$

$$|p0_i-q0_i|<Thr3$$

Here the values of Thr1, Thr2 and Thr3 depend on the quantization parameter (QP) and may be derived from the look-up tables. The line could be line number i=0, line number i=1, line number i=2 or line number i=3.

Embodiment 12

Alternative embodiments of the above mentioned embodiments can use the same criteria but without comparisons with $|p0_0-q0_0|$ and $|p0_3-q0_3|$ to the threshold values. These embodiments can be obtained from the mentioned embodiments by removing the corresponding conditions.

The proposed embodiments improve the subjective and/or objective quality of the HEVC strong filtering. The embodiments enable application of the strong deblocking filter to the areas where the signal in the picture has a form of a gradient or ramp. It also enables application of the deblocking filter to the boundaries between heavily quantized blocks where the signal on the side of the block boundary is not flat. This enables application of the strong deblocking filtering to the areas where the blocking artifacts might otherwise be visible. The proposed filtering decisions can also be used with the strong deblocking filter that has ramp preservation properties. This would also enable better subjective quality of the image or video by more efficient reduction of blocking artifacts.

Figure 7:
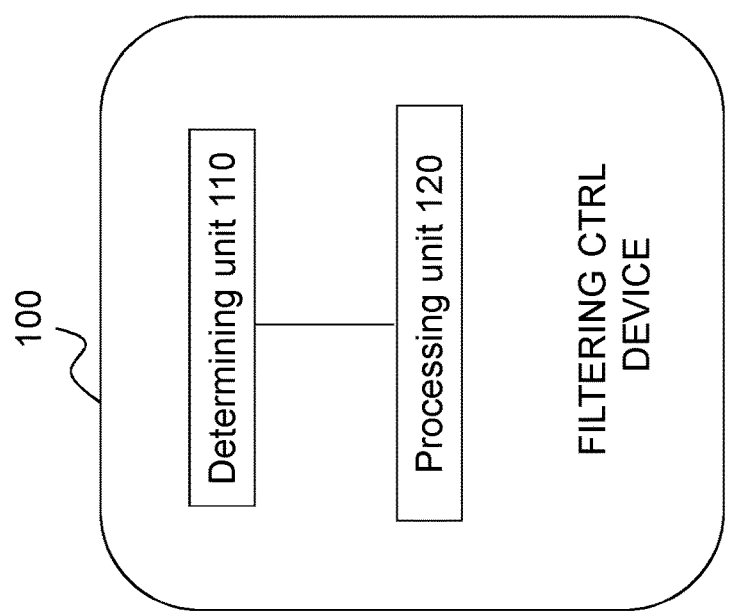
FIG. 7 is a schematic block diagram of a filtering control (ctrl) device according to an embodiment.

FIG. 7 is a schematic block diagram of a filtering control (ctrl) device 100 according to an embodiment. The filtering control device 100 comprises a determining unit 110 configured to determine or check whether pixel values of four pixels in a line of pixels in a block of pixels form an approximate line. The determining unit 110 is also configured to determine or check whether pixel values of four pixels in the line of pixels in a neighboring block of pixels form an approximate line. The filtering control device 100 also comprises a processing unit 120 configured to select to apply strong deblocking filtering to pixel values in the line of pixels in the block of pixels and the neighboring block of pixels if the pixel values of the four pixels in the block of pixels form an approximate line and if the pixel values of the four pixels in the neighboring block of pixels form an approximate line.

The determining unit 110 of the filtering control device 100 is also referred to herein as a determiner or determining means or module. Correspondingly, the processing unit 120 is also referred to as processor or processing means or module.

In an embodiment, the processing unit 120 is configured to select to apply weak deblocking filtering to pixel values in the line of pixels in the block of pixels and the neighboring block of pixels if the pixel values of the four pixels in the block of pixels do not form an approximate line and/or if the pixel values of the four pixels in the neighboring block of pixels do not form an approximate line.

The determining unit 110 is preferably configured, in an embodiment, to determine whether the pixel values of the four pixels in the line of pixels in the block of pixels form a flat line or a ramp. The determining unit 110 is preferably also configured to determine whether the pixel values of the four pixels in the line of pixels in the neighboring block of pixels form a flat line or a ramp. In this embodiment, the processing unit 120 is preferably configured to select to apply strong deblocking filtering if the pixel values of the four pixels in the block of pixels form a flat line or a ramp and if the pixel values of the four pixels in the neighboring block of pixels form a flat ramp or a ramp.

The filtering control device 100 may additionally use an additional criterion in order to select between strong and weak deblocking filtering. In such a case, the determining unit 110 is preferably configured to determine whether a difference between i) a pixel value of a first pixel, relative to the block boundary, in the line of pixels in the block of pixels and ii) a pixel value or a first pixel, relative to the block boundary, in the line of pixels in the neighboring block of pixels is smaller than a threshold value. The processing unit 120 is then preferably configured to select to apply strong deblocking filtering if the pixel values of the four pixels in the block of pixels form an approximate line, if the pixel values of the four pixels in the neighboring block of pixels form an approximate line and if the difference is smaller than the threshold value. If at least one of these criteria is not met the processing unit preferably selects to apply weak deblocking filtering for the pixel values in the current line of pixels.

In a particular embodiment, the determining unit 110 is configured to determine whether pixel values of a first pixel, a second pixel and a third pixel, relative to the block boundary, in the line of pixels in the block of pixels form an approximate line. The determining unit 110 is also configured to determine whether pixel values of the second pixel, the third pixel and a fourth pixel, relative to the block boundary, in the line of pixels in the block of pixels form an approximate line. In this embodiment the determining unit 110 is further configured to determine whether pixel values of a first pixel, a second pixel and a third pixel, relative to the block boundary, in the line of pixels in the neighboring block of pixels form an approximate line. The determining unit 110 is additionally configured to determine whether pixel values of the second pixel, the third pixel and a fourth pixel, relative to the block boundary, in the line of pixels in the neighboring block of pixels form an approximate line.

The processing unit 120 is, in this embodiment, preferably configured to select to apply strong deblocking filtering if the pixel values of the first pixel, the second pixel and the third pixel in the block of pixels form an approximate line, if the pixel values of the second pixel, the third pixel and the fourth pixel in the block of pixels form an approximate line, if the pixel values of the first pixel, the second pixel and the third pixel in the neighboring block of pixels form an approximate line and if the pixel values of the second pixel, the third pixel and the fourth pixel in the neighboring block of pixels form an approximate line.

FIG. 15 illustrates an implementation example of the determining unit 110. The determining unit 110 then comprises a $dp_i$ calculator 111 configured to calculate $dp_i=|p2_i-2 \times p1_i+p0_i|$. The determining unit 110 also comprises a $dp_i$_side calculator 113 configured to calculate $dq_i$_side$=|p3_i-2 \times p2_i+p1_i|$. A $dq_i$ calculator 115 is provided in the determining unit 110 and is configured to calculate $dq_i=|q2_i-2 \times q1_i+q0_i|$. The determining unit 110 further comprises a $dq_i$_side calculator 117 configured to calculate $dq_i$_side$=|q3_i,2 \times q2_i+q1_i|$. In this implementation example the processing unit 120 of the filtering control device 100 is configured to select to apply strong deblocking filtering if $(dp_i+dq_i)<Thr1$ and $(dp_i\_side+dq_i\_side)<Thr2$.

In a particular embodiment of this implementation example the processing unit 120 is configured to select to apply strong deblocking filtering if $2 \times (dp_i+dq_i)<(\beta>>2)$ and $2 \times (dp_i\_side+dq_i\_side)<(\beta>>2)$.

In another implementation example, the determining unit 110 comprises the previously mentioned $dp_i$ calculator 111, $dp_i$_side calculator 113, $dq_i$ calculator 115 and $dq_i$_side calculator 117. The determining unit 110 preferably also comprises a $|p0_i-q0_i|$ calculator 119 configured to calculate $|p0_i-q0_i|$. In this another implementation example the processing unit 120 is configured to select to apply strong deblocking filtering if $(dp_i+dq_i)<Thr1$, $(dp_i\_side+dq_i\_side)<Thr2$ and $|p0_i-q0_i|<Thr3$.

In a particular embodiment of this another implementation example the processing unit 120 is configured to select to apply strong deblocking filtering if $2 \times (dp_i+dq_i)<(\beta>>2)$, $2 \times (dp_i\_side+dq_i\_side)<(\beta>>2)$ and $|p0_i-q0_i|<((5 \times t_c+1)>>1)$.

In another embodiment of this another implementation example the processing unit 120 is configured to select to apply strong deblocking filtering if $2 \times (dp_i+dq_i)<(\beta>>2)$, $2 \times (dp_i\_side+dq_i\_side)<(\beta>>2)$ and $|p0_i-q0_i|<(t_c<<4)$.

Accordingly as illustrated in FIG. 7, the filtering control device 100 implements the functions of embodiments 1-12 or a combination thereof by the determining unit 110 and the processing unit 120, which are configured to determine if the signal on both sides of the block boundary is smooth.

The filtering control device 100 of FIG. 7 with its including units 110-120 (and optional units 111-119 of the determining unit 110 in FIG. 15) could be implemented in hardware. There are numerous variants of circuitry elements that can be used and combined to achieve the functions of the units 110-120 of the filtering control device 100. Such variants are encompassed by the embodiments. Particular examples of hardware implementation of the filtering control device 100 is implementation in digital signal processor (DSP) hardware and integrated circuit technology, including both general-purpose electronic circuitry and application-specific circuitry.

Hence, the steps, functions, procedures and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures and/or blocks described above may be implemented in software such as a computer program for execution by suitable processing circuitry including one or more processing units. Examples of processing circuitry includes, but is not limited to, one or more microprocessors, one or more DSPs, one or more Central Processing Units (CPUs), video acceleration hardware, and/or any suitable programmable logic circuitry such as one or more Field Programmable Gate Arrays (FPGAs) or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 8:
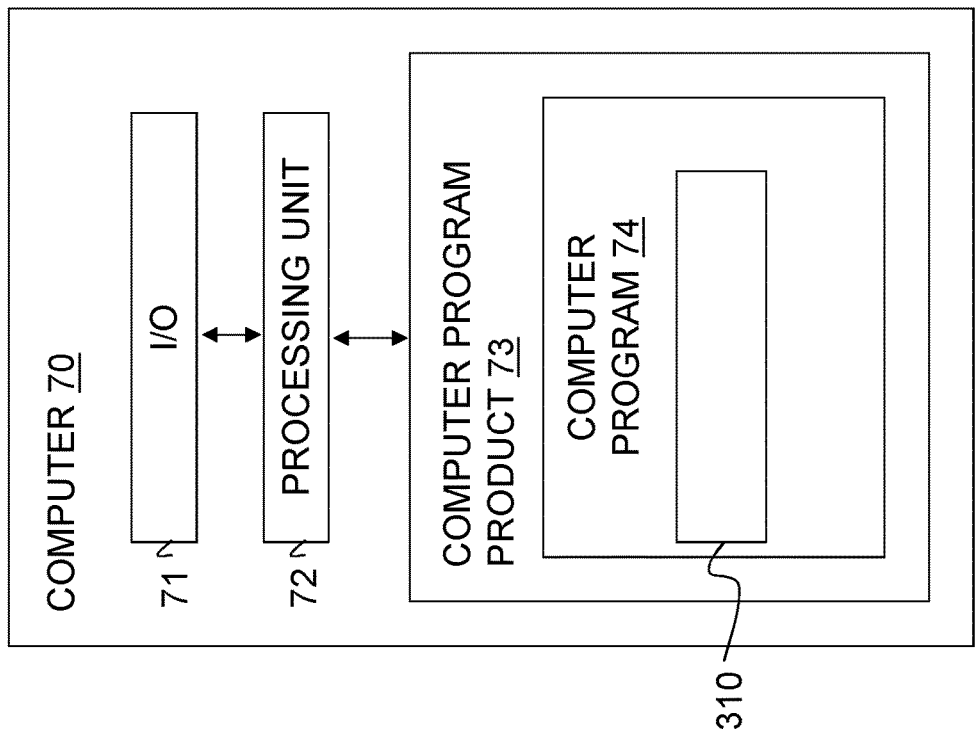
FIG. 8 is a schematic block diagram of a computer according to an embodiment.

The filtering control device 100 described herein could alternatively be implemented e.g. by one or more of a processing unit 72 in a computer 70 and adequate software with suitable storage or memory therefore, a programmable logic device (PLD) or other electronic component(s) as shown in FIG. 8.

In the following, an example of a computer implementation will be described with reference to FIG. 8. The computer 70 comprises a processing unit 72, such as one or more processors or a processing circuit, and a memory 73 represented as a computer program product in the figure. In this particular example, at least some of the steps, functions, procedures and/or blocks described above are implemented in a computer program 74, which is loaded into the memory 73 for execution by the processing unit 72. The processing unit 72 and memory 73 are interconnected to each other to enable normal software execution. An optional input/output unit 71 may also be interconnected to the processing unit 72 and/or the memory 73 to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

The software or computer program 74 may be realized as a computer program product 73, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Universal Serial Bus (USB) memory, a Hard Disk Drive (HDD) storage device, a flash memory, or any other conventional memory device. The computer program 74 may thus be loaded into the operating memory of a computer 70 or equivalent processing device for execution by the processing unit 72 thereof.

For example, the computer program 74 stored in memory includes program instructions executable by the processing unit 72, whereby the processing unit 72 is able or operative to execute the above-described steps, functions, procedure and/or blocks.

The computer 70 or processing unit 72 does not have to be dedicated to only execute the above-described steps, functions, procedure and/or blocks, but may also execute other tasks.

FIG. 8 schematically illustrates an embodiment of a computer 70 having a processing unit 72, such as a DSP or CPU. The processing unit 72 can be a single unit or a plurality of units for performing different steps of the method described herein. The computer 70 also comprises an optional input/output (I/O) unit 71 for receiving recorded or generated video frames or encoded video frames and outputting encoded video frame or decoded video data. The I/O unit 71 has been illustrated as a single unit in FIG. 8 but can likewise be in the form of a separate input unit and a separate output unit.

Furthermore, the computer 70 comprises at least one computer program product 73 in the form of a non-volatile memory, for instance an EEPROM (Electrically Erasable Programmable Read-Only Memory) or a flash memory. The computer program product 73 comprises a computer program 74, which comprises code means 310 which when run on or executed by the computer 70, such as by the processing unit 72, causes the computer 70 to perform the steps of the method described in the foregoing in connection with FIGS. 1, 9-14. Hence, in an embodiment the code means 310 in the computer program 74 comprises a module configured to implement embodiments 1-12 or combinations thereof. This module essentially performs the steps of the flow diagrams in FIGS. 1, 9-14 when run on the processing unit 72. Thus, when the module is run on the processing unit 72 they correspond to the corresponding units 110-120 of FIG. 7.

An embodiment therefore relates to a computer 70 comprising a processing unit 72 and a computer program product 73 comprising a computer program 74. The computer program 74 comprises code means 310, which when run on the processing unit 72, causes the processing unit 72 to check whether pixel values of four pixels in a line of pixels in a block of pixels form an approximate line. The computer program 74 also causes the processing unit 72 to check whether pixel values of four pixels in the line of pixels in a neighboring block of pixels form an approximate line. The computer program 74 further causes the processing unit 72 to select to apply strong deblocking filtering to pixel values in the line of pixels in the block of pixels and the neighboring block of pixels if the pixel values of the four pixels in the block of pixels form an approximate line and if the pixel values of the four pixels in the neighboring block of pixels form an approximate line.

An embodiment also relates to a computer program 74 for filtering control. The computer program 74 comprises code means 310, which when executed by the processing unit 72, causes the processing unit 72 to check whether pixel values of four pixels in a line of pixels in a block of pixels form an approximate line. The computer program 74 also causes the processing unit 72 to check whether pixel values of four pixels in the line of pixels in a neighboring block of pixels form an approximate line. The computer program 74 further causes the processing unit 72 to select to apply strong deblocking filtering to pixel values in the line of pixels in the block of pixels and the neighboring block of pixels if the pixel values of the four pixels in the block of pixels form an approximate line and if the pixel values of the four pixels in the neighboring block of pixels form an approximate line.

An embodiment further relates to a computer program product 73 comprising computer readable code means and a computer program 74 according to above stored on the computer readable code means.

Figure 2:
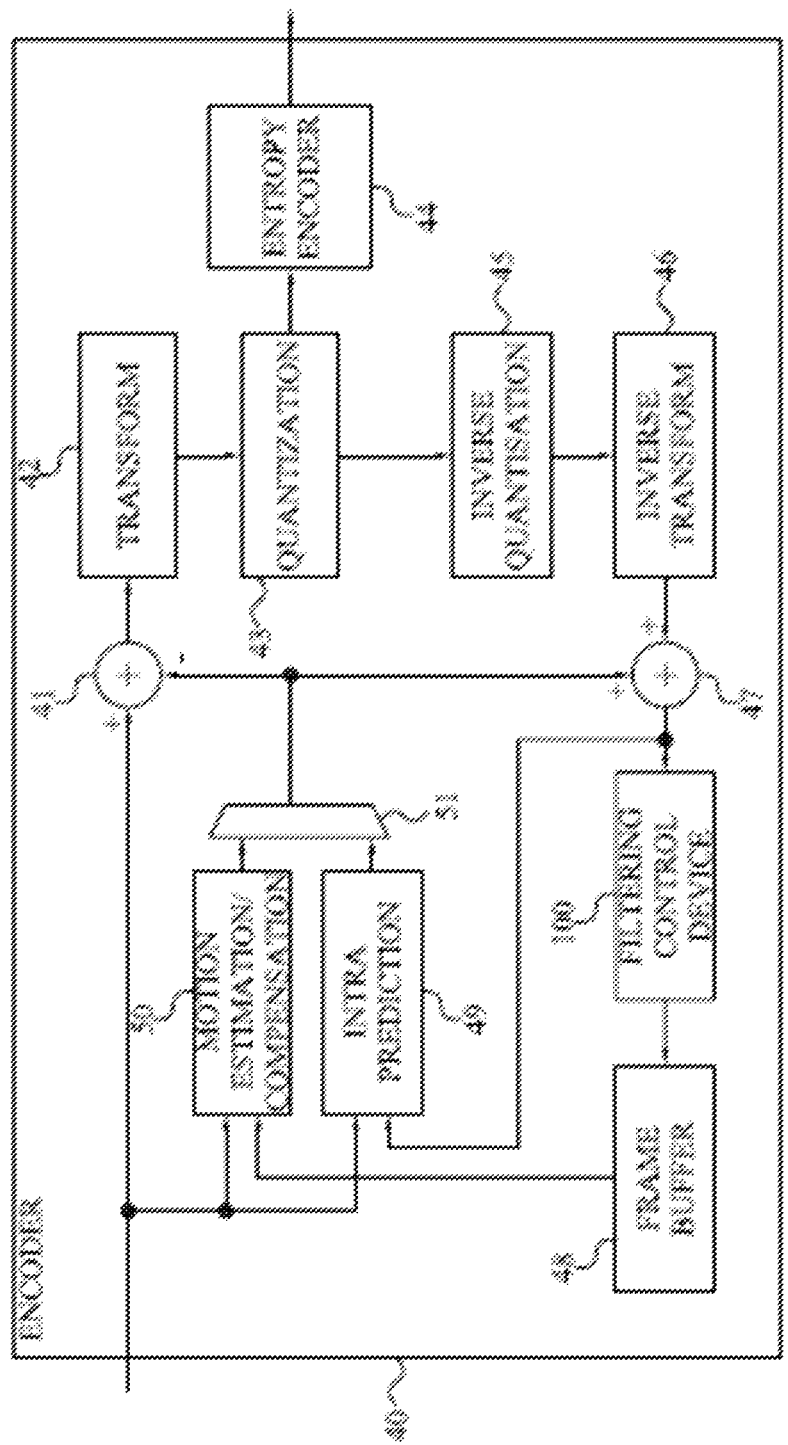
FIG. 2 is a schematic block diagram of an encoder according to an embodiment.
Figure 3:
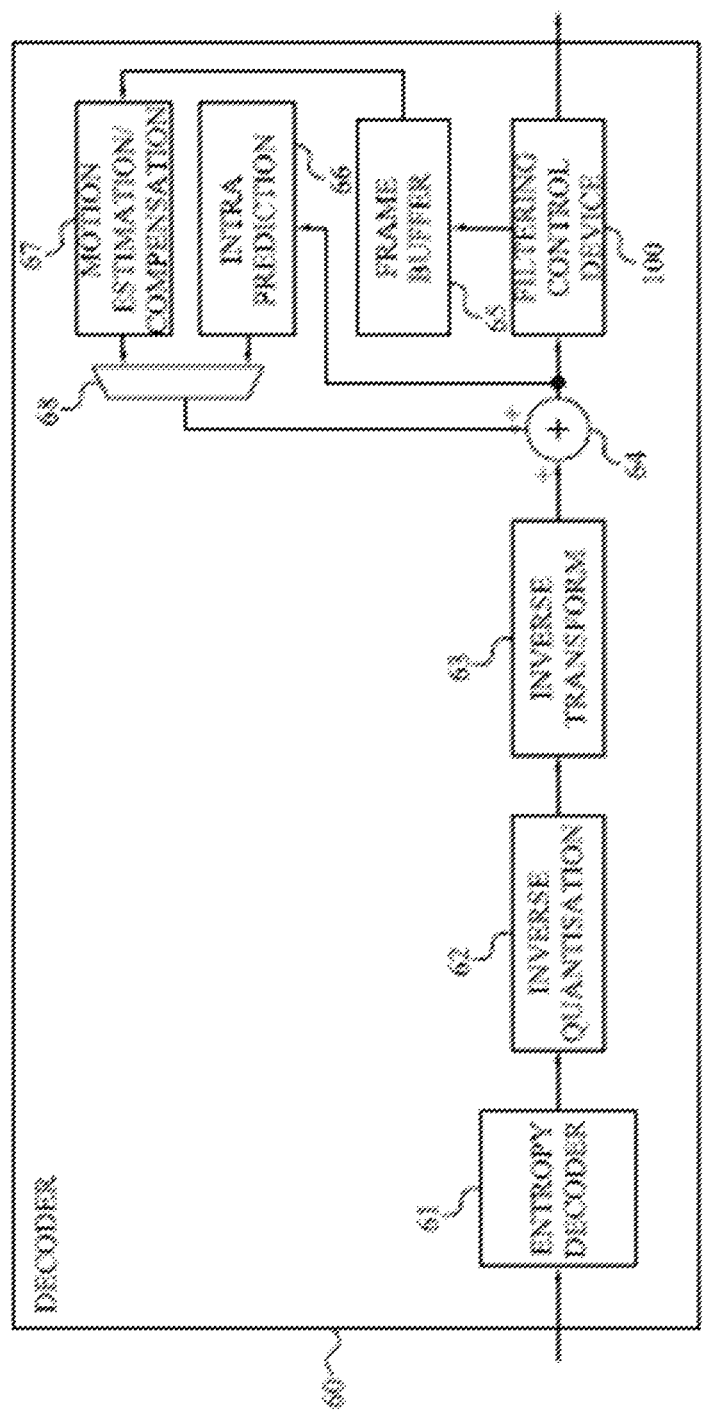
FIG. 3 is a schematic block diagram of a decoder according to an embodiment.

The methods of the embodiments are performed in a filtering control device which can be located in an encoder or a decoder as schematically illustrated in FIGS. 2 and 3. FIGS. 2 and 3 illustrate the example when the method is performed inside the coding loop.

The embodiments can be implemented in a filtering control device.

FIG. 2 is a schematic block diagram of an encoder 40 for encoding a block of pixels in a video frame of a video sequence according to an embodiment.

A current block of pixels is predicted by performing a motion estimation by a motion estimator 50 from an already provided block of pixels in the same frame or in a previous frame. The result of the motion estimation is a motion or displacement vector associated with the reference block, in the case of inter prediction. The motion vector is utilized by a motion compensator 50 for outputting an inter prediction of the block of pixels.

An intra predictor 49 computes an intra prediction of the current block of pixels. The outputs from the motion estimator/compensator 50 and the intra predictor 49 are input in a selector 51 that either selects intra prediction or inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction.

The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels.

The transformed and quantized residual error for the current block of pixels is also provided to an inverse quantizer 45 and inverse transformer 46 to retrieve the original residual error. This error is added by an adder 47 to the block prediction output from the motion compensator 50 or the intra predictor 49 to create a reference block of pixels that can be used in the prediction and coding of a next block of pixels. This new reference block is first processed by a filtering control device 100 in order to control any filtering that is applied to the reference block to combat any artifact. The processed new reference block is then temporarily stored in a frame buffer 48, where it is available to the intra predictor 49 and the motion estimator/compensator 50.

FIG. 3 is a corresponding schematic block diagram of a decoder 60 comprising a filtering control device 100 according to any of the embodiments or in combinations thereof. The decoder 60 comprises a decoder 61, such as entropy decoder, for decoding an encoded representation of a block of pixels to get a set of quantized and transformed residual errors. These residual errors are dequantized in an inverse quantizer 62 and inverse transformed by an inverse transformer 63 to get a set of residual errors.

These residual errors are added in an adder 64 to the pixel values of a reference block of pixels. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block of pixels output from the adder 64 is input to a filtering control device 100 in order to control any filter that is applied to combat any artifacts. The filtered block of pixels is output form the decoder 60 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67.

The output from the adder 64 is preferably also input to the intra predictor 66 to be used as an unfiltered reference block of pixels.

In the embodiments disclosed in FIGS. 2 and 3 the filtering control device 100 controls filtering in the form of so called in-loop filtering. In an alternative implementation at the decoder 60 the filtering control device 100 is arranged to perform so called post-processing filtering. In such a case, the filtering control device 100 operates on the output frames outside of the loop formed by the adder 64, the frame buffer 65, the intra predictor 66, the motion estimator/compensator 67 and the selector 68. No filtering and filter control is then typically done at the encoder.

The solution, including the embodiments above, applies to a decoder, an encoder, as an in-loop filter or as a post-processing filter. The encoder may for example be located in a transmitter in a video camera in e.g. a mobile device. The decoder may for example be located in a receiver in a video camera or any other device for displaying, decoding or transcoding a video stream.

The solution is not limited to HEVC but may be applied to any extension of HEVC such as a scalable extension or multiview extension or to a different video codec.

Figure 5:
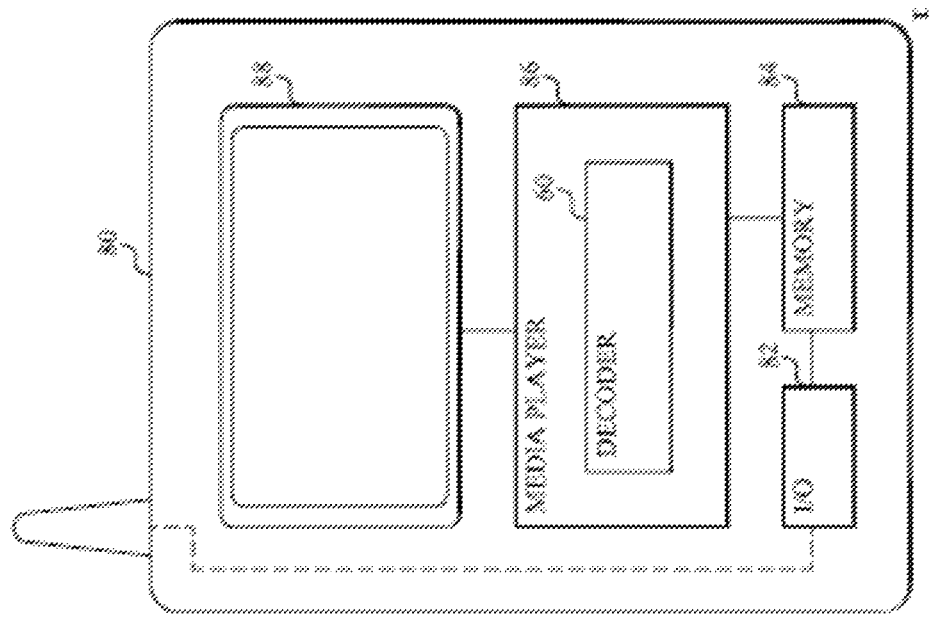
FIG. 5 is a schematic block diagram of a user equipment according to another embodiment.

FIG. 5 is a schematic block diagram of a user equipment or media terminal 80 housing a decoder 60 with a filtering control device. The user equipment 80 can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes, TVs, computers, decoders, game consoles, etc. The user equipment 80 comprises a memory 84 configured to store encoded video frames. These encoded video frames can have been generated by the user equipment 80 itself. Alternatively, the encoded video frames are generated by some other device and wirelessly transmitted or transmitted by wire to the user equipment 80. The user equipment 80 then comprises a transceiver (transmitter and receiver) or input and output port 82 to achieve the data transfer.

The encoded video frames are brought from the memory 84 to a decoder 60, such as the decoder illustrated in FIG. 3. The decoder 60 comprises a filtering control device according one of embodiments 1-12 or combinations thereof. The decoder 60 then decodes the encoded video frames into decoded video frames. The decoded video frames are provided to a media player 86 that is configured to render the decoded video frames into video data that is displayable on a display or screen 88 of or connected to the user equipment 80.

In FIG. 5, the user equipment 80 has been illustrated as comprising both the decoder 60 and the media player 86, with the decoder 60 implemented as a part of the media player 86. This should, however, merely be seen as an illustrative but non-limiting example of an implementation embodiment for the user equipment 80. Also distributed implementations are possible where the decoder 60 and the media player 86 are provided in two physically separated devices are possible and within the scope of user equipment 80 as used herein. The display 88 could also be provided as a separate device connected to the user equipment 80, where the actual data processing is taking place.

Figure 4:
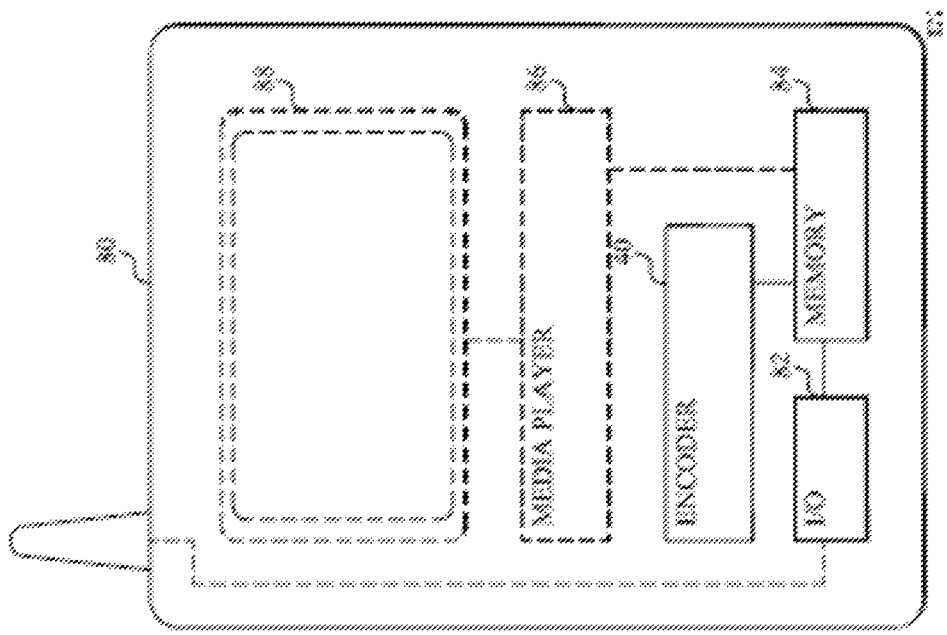
FIG. 4 is a schematic block diagram of a user equipment according to an embodiment.

FIG. 4 illustrates another embodiment of a user equipment 80 that comprises en encoder, such as the encoder of FIG. 2, comprising a filtering control device according to the embodiments. The encoder 40 is then configured to encode video frames received by the I/O unit 82 and/or generated by the user equipment 80 itself. In the latter case, the user equipment 80 preferably comprises a media engine or recorder, such as in the form of or connected to a (video)

camera. The user equipment 80 may optionally also comprise a media player 86, such as a media player 86 with a decoder and filtering control device according to the embodiments, and a display 88.

As illustrated in FIG. 6, the encoder 40 and/or decoder 60, such as illustrated in FIGS. 2 and 3, may be implemented in a network device 30 being or belonging to a network node in a communication network 32 between a sending unit 34 and a receiving user equipment 36. Such a network device 30 may be a device for converting video according to one video coding standard to another video coding standard, for example, if it has been established that the receiving user equipment 36 is only capable of or prefers another video coding standard than the one sent from the sending unit 34. The network device 30 can be in the form of or comprised in a radio base station, a Node-B or any other network node in a communication network 32, such as a radio-based network.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A deblocking filter control method comprising:
a) checking whether pixels values of four pixels in a line of pixels in a block of pixels form an approximate line;
b) checking whether pixel values of four pixels in said line of pixels in a neighboring block of pixels form an approximate line; and
selecting to apply strong deblocking filtering to pixel values in said line of pixels in said block of pixels and said neighboring block of pixels if said pixel values of said four pixels in said block of pixels form an approximate line and if said pixel values of said four pixels in said neighboring block of pixels form an approximate line,
wherein said approximate lines formed by said four pixels in said block of pixels and in said neighboring block of pixels are ramp-shaped,
wherein:
a) checking whether said pixel values form an approximate line comprises:
a1) checking whether pixel values of a first pixel, a second pixel and a third pixel, relative to a block boundary between said block of pixels and said neighboring block of pixels, in said line of pixels in said block of pixels form an approximate line; and
a2) checking whether pixel values of said second pixel, said third pixel and a fourth pixel, relative to said block boundary, in said line of pixels in said block of pixels form an approximate line;
b) checking whether said pixel values form an approximate line comprises:
b1) checking whether pixel values of a first pixel, a second pixel and a third pixel, relative to said block boundary, in said line of pixels in said neighboring block of pixels form an approximate line; and
b2) checking whether pixel values of said second pixel, said third pixel and a fourth pixel, relative to said block boundary, in said line of pixels in said neighboring block of pixels form an approximate line; and selecting to apply strong deblocking filtering comprises selecting to apply strong deblocking filtering if said pixel values of said first pixel, said second pixel and said third pixel in said block of pixels form an approximate line, if said pixel values of said second pixel, said third pixel and said fourth pixel in said block of pixels form an approximate line, if said pixel values of said first pixel, said second pixel and said third pixel in said neighboring block of pixels form an approximate line, and if said pixel values of said second pixel, said third pixel and said fourth pixel in said neighboring block of pixels form an approximate line wherein,
a) checking whether said pixel values form an approximate line comprises:
a1) calculating $dp_i = |p2_i - 2 \times p1_i + p0_i|$, wherein $p0_i$ denotes a pixel value of said first pixel in said line of pixels in said block of pixels, $p1_i$ denotes a pixel value of said second pixel in said line of pixels in said block of pixels, and $p2_i$ denotes a pixel value of said third pixel in said line of pixels in said block of pixels; and
a2) calculating $dp_{i\_side} = |p3_i - 2 \times p2_i + p1_i|$, wherein $p3_i$ denotes a pixel value of said fourth pixel in said line of pixels in said block of pixels;
b) checking whether said pixel values form an approximate line comprises:
b1) calculating $dq_i = |q2_i - 2 \times q1_i + q0_i|$, wherein $q0_i$ denotes a pixel value of said first pixel in said line of pixels in said neighboring block of pixels, $q1_i$ denotes a pixel value of said second pixel in said line of pixels in said neighboring block of pixels, and $q2_i$ denotes a pixel value of said third pixel in said line of pixels in said neighboring block of pixels; and
b2) calculating $dq_{i\_side} = |q3_i - 2 \times q2_i + q1_i|$, wherein $q3_i$ denotes a pixel value of said fourth pixel in said line of pixels in said neighboring block of pixels; and
selecting to apply strong deblocking filtering comprises selecting to apply strong deblocking filtering if $(dp_i + dq_i) < Thr1$ and $(dp_{i\_side} + dq_{i\_side}) < Thr2$, wherein Thr1 denotes a first threshold value and Thr2 denotes a second threshold value.

2. The method according to claim 1, wherein selecting to apply strong deblocking filtering comprises selecting to apply strong deblocking filtering if $2 \times (dp_i + dq_i) < (\beta >> 2)$ and $2 \times (dp_{i\_side} + dq_{i\_side}) < (\beta >> 2)$, wherein $>>$ represents a right shift operator defined as $$a \gg b = \left\lfloor \frac{a}{2^b} \right\rfloor$$

and $\lfloor C \rfloor$ is a largest integer not greater than c and $\beta$ is a parameter that depends on a quantization parameter value associated with said block of pixels.

3. The method according to claim 1, further comprising calculating $|p0_i - q0_i|$, wherein selecting to apply strong deblocking filtering comprises selecting to apply strong deblocking filtering if $(dp_i + dq_i) < Thr1$, $(dp_{i\_side} + dq_{i\_side}) < Thr2$ and $|p0_i - q0_i| < Thr3$, wherein Thr3 denotes a third threshold value.

4. The method according to claim 3, wherein selecting to apply strong deblocking filtering comprises selecting to apply strong deblocking filtering if $2 \times (dp_i + dq_i) < (\beta >> 2)$, $2\times(dp_i\_side+dq_i\_side)<(\beta>>2)$ and $|p0_i-q0_i|<((5\times t_c+1)>>1)$, wherein $>>$ represents a right shift operator defined as $$a \gg b = \left\lfloor \frac{a}{2^b} \right\rfloor$$

and $\lfloor c \rfloor$ is a largest integer not greater than c and $\beta$ and $t_c$ are parameters that depend on a quantization parameter value associated with said block of pixels.

5. The method according to claim 3, wherein selecting to apply strong deblocking filtering comprises selecting to apply strong deblocking filtering if $2\times(dp_i+dq_i)<(\beta>>2)$, $2\times(dp_i\_side+dq_i\_side)<(\beta>>2)$ and $|p0_i-q0_i|<(t_c<<4)$, wherein $>>$ represents a right shift operator defined as $$a \gg b = \left\lfloor \frac{a}{2^b} \right\rfloor$$

and $\lfloor c \rfloor$ is a largest integer not greater than c, $<<$ denotes a left shift operator defined as $a<<b=a\times 2^b$ and $\beta$ and $t_c$ are parameters that depend on a quantization parameter value associated with said block of pixels.

6. A filtering control device comprising:
a determining unit configured to determine whether pixels values of four pixels in a line of pixels in a block of pixels form an approximate line, and determine whether pixel values of four pixels in said line of pixels in a neighboring block of pixels form an approximate line; and
a processing unit configured to select to apply strong deblocking filtering to pixel values in said line of pixels in said block of pixels and said neighboring block of pixels if said pixel values of said four pixels in said block of pixels form an approximate line and if said pixel values of said four pixels in said neighboring block of pixels form an approximate line,
wherein said approximate lines formed by said four pixels in said block of pixels and in said neighboring block of pixels are ramp-shaped,
wherein:
said determining unit is configured to determine whether pixel values of a first pixel, a second pixel and a third pixel, relative to a block boundary between said block of pixels and said neighboring block of pixels, in said line of pixels in said block of pixels form an approximate line, determine whether pixel values of said second pixel, said third pixel and a fourth pixel, relative to said block boundary, in said line of pixels in said block of pixels form an approximate line, determine whether pixel values of a first pixel, a second pixel and a third pixel, relative to said block boundary, in said line of pixels in said neighboring block of pixels form an approximate line, and determine whether pixel values of said second pixel, said third pixel and a fourth pixel, relative to said block boundary, in said line of pixels in said neighboring block of pixels form an approximate line; and
said processing unit is configured to select to apply strong deblocking filtering if said pixel values of said first pixel, said second pixel and said third pixel in said block of pixels form an approximate line, if said pixel values of said second pixel, said third pixel and said fourth pixel in said block of pixels form an approximate line, if said pixel values of said first pixel, said second pixel and said third pixel in said neighboring block of pixels form an approximate line, and if said pixel values of said second pixel, said third pixel and said fourth pixel in said neighboring block of pixels form an approximate line, and
wherein
said determining unit comprises:
a $dp_i$ calculator configured to calculate $dp_i=|p2_i-2\times p1_i+p0_i|$, wherein $p0_i$ denotes a pixel value of said first pixel in said line of pixels in said block of pixels, $p1_i$ denotes a pixel value of said second pixel in said line of pixels in said block of pixels, and $p2_i$ denotes a pixel value of said third pixel in said line of pixels in said block of pixels;
a $dp_i\_side$ calculator configured to calculate $dp_i\_side=|p3_i-2\times p2_i+p1_i|$, wherein $p3_i$ denotes a pixel value of said third pixel in said line of pixels in said block of pixels;
a $dq_i$ calculator configured to calculate $dq_i=|q2_i-2\times q1_i+q0_i|$, wherein $q0_i$ denotes a pixel value of said first pixel in said line of pixels in said neighboring block of pixels, $q1_i$ denotes a pixel value of said second pixel in said line of pixels in said neighboring block of pixels, and $q2_i$ denotes a pixel value of said third pixel in said line of pixels in said neighboring block of pixels; and
a $dq_i\_side$ calculator configured to calculate $dq_i\_side=|q3_i-2\times q2_i+q1_i|$, wherein $q3_i$ denotes a pixel value of said fourth pixel in said line of pixels in said neighboring block of pixels; and
said processing unit is configured to select to apply strong deblocking filtering if $(dp_i+dq_i)<Thr1$ and $(dp_i\_side+dq_i\_side)<Thr2$, wherein Thr1 denotes a first threshold value and Thr2 denotes a second threshold value.

7. The filtering control device according to claim 6, wherein said processing unit is configured to select to apply strong deblocking filtering if $2\times(dp_i+dq_i)<(\beta>>2)$ and $2\times(dp_i\_side+dq_i\_side)<(\beta>>2)$, wherein $>>$ represents a right shift operator defined as $$a \gg b = \left\lfloor \frac{a}{2^b} \right\rfloor$$

and $\lfloor c \rfloor$ is a largest integer not greater than c and $\beta$ is a parameter that depends on a quantization parameter value associated with said block of pixels.

8. The filtering control device according to claim 6, wherein
said determining unit comprises a $|p0_i-q0_i|$ calculator configured to calculate $|p0_i-q0_i|$; and
said processing unit is configured to select to apply strong deblocking filtering if $(dp_i+dq_i)<Thr1$, $(dp_i\_side+dq_i\_side)<Thr2$ and $|p0_i-q0_i|<Thr3$, wherein Thr3 denotes a third threshold value.

9. The filtering control device according to claim 8, wherein said processing unit is configured to select to apply strong deblocking filtering if $2\times(dp_i+dq_i)<(\beta>>2)$, $2\times(dp_i\_side+dq_i\_side)<(\beta>>2)$ and $|p0_i-q0_i|<((\delta\times t_c+1)>>1)$, wherein $>>$ represents a right shift operator defined as $$a \gg b = \left\lfloor \frac{a}{2^b} \right\rfloor$$

and $\lfloor c \rfloor$ is a largest integer not greater than c and $\beta$ and $t_c$ are parameters that depend on a quantization parameter value associated with said block of pixels.

10. The filtering control device according to claim 8, wherein said processing unit is configured to select to apply strong deblocking filtering if $2\times(dp_i+dq_i)<(\beta>>2)$, $2\times(dp_{i\_side}+dq_{i\_side})<(\beta>>2)$ and $|p0_i-q0_i|<(t_c<<4)$, wherein $>>$ represents a right shift operator defined as $$a \gg b = \left\lfloor \frac{a}{2^b} \right\rfloor$$

and $\lfloor c \rfloor$ is a largest integer not greater than c, $<<$ denotes a left shift operator defined as $a<<b=a\times 2^b$ and $\beta$ and $t_c$ are parameters that depend on a quantization parameter value associated with said block of pixels.

* * * * *